US008817623B2

(12) United States Patent  
Gupta et al.

(10) Patent No.: US 8,817,623 B2  
(45) Date of Patent: Aug. 26, 2014

(54) MULTI-RAT CARRIER AGGREGATION FOR INTEGRATED WWAN-WLAN OPERATION

(75) Inventors: Vivek Gupta, San Jose, CA (US); Kamran Etemad, Potomac, MD (US)

(73) Assignee: Intel Corporation, Santa Clara, CA (US)

( * ) Notice: Subject to any disclaimer, the term of this patent is extended or adjusted under 35 U.S.C. 154(b) by 113 days.

(21) Appl. No.: 13/537,989

(22) Filed: Jun. 29, 2012

(65) Prior Publication Data

US 2013/0083783 A1 Apr. 4, 2013

Related U.S. Application Data

(60) Provisional application No. 61/542,726, filed on Oct. 3, 2011.

(51) Int. Cl.  
*H04L 12/56* (2006.01)

(52) U.S. Cl.  
USPC .......................... 370/235; 370/392; 370/353

(58) Field of Classification Search  
CPC ..... H04L 47/10; H04L 47/30; H04L 47/2441; H04L 45/00; H04L 29/0653; H04L 29/06027; H04L 12/6418; H04M 7/006  
USPC .................. 370/229, 235, 389, 392, 352, 353  
See application file for complete search history.

(56) References Cited

U.S. PATENT DOCUMENTS

| | | | |
|---|---|---|---|
| 6,374,112 B1 | 4/2002 | Widegren et al. | |
| 6,389,005 B1 | 5/2002 | Cruickshank | |
| 6,760,314 B1 | 7/2004 | Iwata | |
| 2002/0068566 A1 | 6/2002 | Ohlsson et al. | |
| 2002/0085516 A1* | 7/2002 | Bridgelall | 370/329 |
| 2007/0058669 A1 | 3/2007 | Hoffmann et al. | |
| 2011/0044198 A1 | 2/2011 | Persson et al. | |
| 2012/0155298 A1* | 6/2012 | Yang et al. | 370/252 |
| 2012/0315905 A1 | 12/2012 | Zhu et al. | |

* cited by examiner

*Primary Examiner* — Ronald Abelson  
(74) *Attorney, Agent, or Firm* — Thorpe, North & Western, LLP

(57) ABSTRACT

Systems and methods for Multi-Radio Access Technology (RAT) Carrier Aggregation (MRCA) wireless wide area network (WWAN) assisted wireless local area network (WLAN) discovery, association, and flow switching are disclosed. One system comprises a control signaling module in a wireless device that includes a WWAN radio integrated with a WLAN radio. The control signaling module is configured to communicate WWAN control signaling and WLAN control signaling via a WWAN radio connection of the wireless device. A dynamic flow mapping module is configured to form a flow-mapping table to dynamically map service flows between the WWAN radio and the WLAN radio in the wireless device. A flow routing module is configured to route data packets to one of the WWAN radio and the WLAN radio in the wireless device based on the flow-mapping table to transmit and receive the data packets via the wireless device.

25 Claims, 15 Drawing Sheets

| Element / Attribute Name | Definition |
|---|---|
| WLAN Network Information | Information about each of the WLAN AP attached to eNB |
| networkIdentifier | Combination of SSID and HESSID |
| radioParameters | Channel Identifier, Frequency bands, Max Data Rate |
| requestMeasurement | Flag indicating request for RSSI, SNR and PercentMissedBeacons for each of the WLAN APs specified in networkInformation |

FIG. 8a

| Element / Attribute Name | Definition |
|---|---|
| wlanRadioStatus | Busy : radio is busy with other operation & cannot be used for CA<br>Not Available for CA:<br>Available for CA |
| WLAN Measurement Info | If requsted info about Pre-Association measurements for each of the WLAN APs (for each BSSID) |
| RSSI | Signal Strength |
| percentMissedBeacons | % of Missed Beacons |
| SNR | Signal to Noise Ratio |

FIG. 8b

| Element / Attribute Name | Definition |
|---|---|
| statusAssociation | Flag indicates whether WLAN Association should be established or not |
| wlanId | BSSID of the selected WLAN AP with which Association may be etablished. If none, then this is NULL. |
| modeOfConnection | Indicates mode of connection. Can be one of the following:<br>Infrastructure Mode, WiFi Direct |
| reasonCode | If Association cannot be established, indicates reason for decline |

FIG. 8c

| Element / Attribute Name | Definition |
|---|---|
| wlanId | BSSID of the target WLAN AP with which offloading should be performed. If none, then this is NULL |
| modeOfConnection | Indicates mode of connection, for new connection. Can be one of the following:<br>Infrastructure Mode, WiFi Direct |
| Flow Information | Information about each of the current flows |
| numberOfFlows | Number of flows. For each flow below info is included |
| flowId | Identifier for this flow |
| flowQCI | Recommended WiFi QoS Class |

FIG. 8d

| Element / Attribute Name | Definition |
|---|---|
| statusOffloading | Flag indicating if offloading was successfully enabled at the UE or not |

FIG. 8e

| Element / Attribute Name | Definition |
|---|---|
| requestMeasurement | Flag indicating request for following parameters: RSSI, SNR and PercentMissedBeacons, PercentTxErrors, PercentTxRetries, CrcErrors, TransmitPowerLevel |

FIG. 8f

| Element / Attribute Name | Definition |
|---|---|
| measurementReport | Includes values for following parameters: RSSI, SNR and PercentMissedBeacons, PercentTxErrors, PercentTxRetries, CrcErrors, TransmitPowerLevel |

FIG. 8g

| Element / Attribute Name | Definition |
|---|---|
| BSSID | ID of target AP as requested by UE |
| Flow Information | Information about each of the current flows |
| numberOfFlows | Number of flows. For each flow below info is included |
| flowId | Identifier for this flow |
| flowBearer | Current bearer selected (WWAN or WLAN) |

FIG. 8h

| Element / Attribute Name | Definition |
|---|---|
| Flow Information | Information about each of the current flows |
| BSSID | BSSID of Target AP |
| numberOfFlows | Number of flows. For each flow below info is included |
| flowId | Identifier for this flow |
| flowBearer | Bearer selected (WWAN or WLAN) |

FIG. 8i

| Element / Attribute Name | Definition |
|---|---|
| wlanId | BSSID of the selected WLAN AP with which offloading is to be disabled. |

FIG. 8j

| Element / Attribute Name | Definition |
|---|---|
| wlanId | BSSID of the selected WLAN AP with which offloading was to be disabled. |
| statusOffloading | Indicates status of the offloading operation. ON/OFF |

FIG. 8k

MULTI-RAT CARRIER AGGREGATION FOR INTEGRATED WWAN-WLAN OPERATION

RELATED APPLICATIONS

This application claims the benefit of and hereby incorporates by reference U.S. Provisional Patent Application Ser. No. 61/542,726, filed Oct. 3, 2011.

BACKGROUND

As the use of mobile wireless devices, such as smart phones and tablet devices, becomes more ubiquitous, the demands on the limited amount of radio frequency spectrum used by those devices also increases, resulting in wireless network congestion in the licensed spectrum. In addition, the increased use of high bandwidth applications such as audio and video streaming can increase demands beyond the capability of the available spectrum. This is especially true in high density and high use locations such as large cities and universities. One projection estimates a growth of 20 times in mobile internet traffic from 2010 to 2015.

Improvements in wireless architectures, hardware design, and processor speed have significantly increased the efficiency of wireless devices in their use of the available spectrum. However, the ability to transmit a greater number of bits per second per hertz of available bandwidth may be reaching an upper limit with the currently available battery technology.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIGS. 8*a*-8*k* depict examples of RRC signaling involved with the steps of FIGS. 4-7 in accordance with an example;

Figure 1:
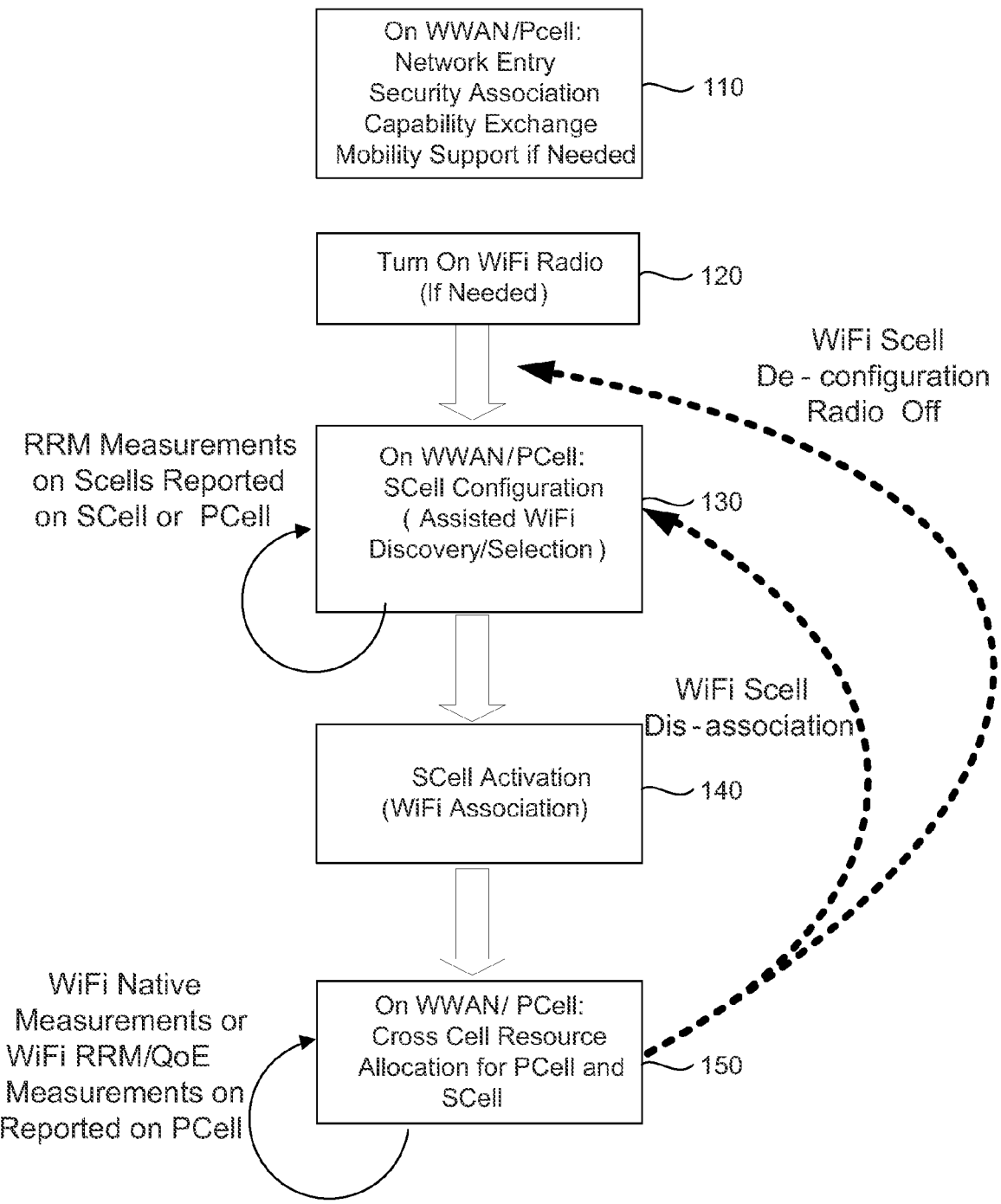
FIG. 1 illustrates a flowchart depicting an example of procedures involved in the cross radio access technology integration between a Primary Access Cell (PCell) and a Secondary Access Cell (SCell) in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

An exponential increase in the amount of wireless data transmission has created congestion in wireless networks using licensed spectrum to provide wireless communication services for wireless devices such as smart phones and tablet devices, to name a few. The congestion is especially apparent in high density and high use locations such as urban locations and universities.

One technique for providing additional bandwidth capacity to wireless devices is through the use of unlicensed spectrum, given the limited availability and high cost of licensed spectrum. Many types of wireless devices are capable of communicating via licensed spectrum, such as through a cellular network, and via unlicensed spectrum, such as via a WiFi hotspot. Wi-Fi is a common name, coined by the WiFi Alliance, for an Institute of Electronics and Electrical Engineers (IEEE) 802.11 set of standards for communicating in unlicensed spectrum including the 2.4, 3.7 and 5 GHz frequency bands. The set of standards includes the IEEE 802.11a standard released in 1999 for communication in the 5 GHz and 3.7 GHz band, the IEEE 802.11b standard, also released in 1999 for communication in the 2.4 GHz band, the 802.11g standard released in 2003 for communication in the 2.4 GHz range via orthogonal frequency division multiplexing (OFDM) and/or direct sequence spread spectrum (DSSS), the 802.11n standard released in 2009 for communication in the 2.4 GHz and 5 GHz bands using multiple-input multiple-output (MIMO), the 802.11-2012 standard released in March of 2012, and the 802.11ac standard that is currently under development. This list is not intended to be limiting. Additional 802.11 standards are also considered to be within the scope of embodiments of the present invention.

While WiFi has been given as an example of a standard used to communicate via an unlicensed portion of the radio frequency spectrum, additional standards for communicating in a portion of the unlicensed spectrum may also be used, including the IEEE 802.15 family of personal area networks (PAN), and Bluetooth.

Communication in an unlicensed band may occur in one of the industrial, scientific and medical (ISM) radio bands that are reserved internationally for the use of radio frequency (RF) energy for industrial, scientific and medical purposes, including but not limited to the 60 GHz band that is used for high bandwidth communication.

Standards such as WiFi or Bluetooth are used to provide wireless local area networks (WLAN) that can be accessed by dual mode devices that are also capable of accessing a cellular networking standard such as IEEE 802.16 standard, commonly referred to as WiMAX (worldwide interoperability for microwave access), and the third generation partnership project (3GPP). Releases of the IEEE 802.16 standard include the IEEE 802.16e-2005, 802.16-2009, and 802.16m-2011. Releases of the 3GPP standard include the 3GPP LTE, Release 8 in the fourth quarter of 2008, 3GPP LTE Advanced Release 10 in the first quarter of 2011, and 3GPP LTE Advanced Release 11 (stage 2) in the first quarter of 2012.

Currently, WLAN is integrated as a separate network to the 3GPP evolved packet core (EPC). Existing mobile wireless device based WiFi offload solutions can enable selective switching of flows based on operator or user policies. These solutions require the operation and maintenance of a separate WLAN radio access network, thereby resulting in greater operational and capital expenditures.

In order to access both licensed and unlicensed portions of the spectrum, the mobile wireless device typically needs to authenticate using the WLAN access network which also impacts the core network entities, such as the 3GPP core network entities including the Authentication, Authorization and Accounting (AAA) server, the Policy Control and Charging Rules Function (PCRF), the Packet Data Network (PDN) gateway, and so forth. Each of these network entities also need to be aware of the WLAN radio access network, thus necessitating changes in 3GPP core entities and increased operational maintenance. These solutions may also have some performance limitations due to relatively longer flow switching latencies and distributed offloading decisions which are based on semi-static network policies that may not take into account real time impacts to other mobile wireless devices and overall system performance.

Accordingly, a tighter integration and aggregation of cellular type networks configured to use licensed portions of the radio spectrum, with wireless local area networks designed to use unlicensed portions of the radio spectrum, can substantially improve performance. For example, the integration of 3GPP access network components, such as the eNodeB (eNB) with the WLAN access networks can enable a dual mode device to use the licensed and unlicensed portions of the spectrum with minimal impact to the 3GPP core network elements. This solution can enhance the overall user experience without degrading the quality of service (QoS), mobility, security, and power management when capacity is expanded to the unlicensed spectrum. Changes to the WLAN access network can be minimized as well, with preferably no changes to the WLAN air-interface. The term "eNB" or "eNodeB" is used interchangeably with the term "base station" herein.

In accordance with one embodiment of the present invention, a Radio Access Network (RAN) level approach of adding capacity with unlicensed spectrum, which relies on the availability of multi-mode radio infrastructure elements, is disclosed. In one embodiment a base station can include the access point for both the unlicensed portion of the spectrum (i.e. a WLAN WiFi access point) that is integrated with an access point for a licensed portion of the spectrum (i.e. a 3GPP LTE eNB) to provide wireless wide area network (WWAN) capabilities.

The availability of a multi-mode infrastructure enables tighter coordination between the WWAN and the WLAN interfaces to better manage the WLAN offload experience, without significant changes in other parts of an operator's network. On the device side, given that most 3G and 4G devices include both 3GPP Long Term Evolution (LTE) and WiFi capabilities, such coupling may be accomplished with a relatively simple software upgrade and with no changes in hardware and lower layer implementations.

The Release 10 of the 3GPP LTE system supports bandwidth aggregation across multiple carriers or cells to provide wideband use experience using potentially fragmented spectrum. However, these capabilities are defined assuming all cells and/or carriers are operating using the same technology in the licensed spectrum over a WWAN. As heterogeneous network architectures are increasingly deployed, with layers of small cells overlaid on a macro-cell coverage area to offload traffic, it becomes relevant to develop infrastructure and technology solutions that can combine the strengths of WLAN and WWAN protocols, including WLAN protocols over unlicensed bands.

In accordance with one embodiment of the present invention, WiFi radios in the WLAN spectrum (i.e. the unlicensed spectrum) can simply be treated as a "virtual" or "extension" carrier for seamless inclusion in the 3GPP operator's access network by extending the carrier aggregation concept. The seamless inclusion can move beyond the current technologies that still require a WWAN operator to maintain a separate radio access and backend core network for access to a WLAN network using a dual mode device.

WiFi Offload Framework

FIG. 1 provides a flowchart depicting an example of high level procedures involved in the cross radio access technology integration between a WWAN radio configured to be used as a Primary-access Cell (PCell) configured to communicate in a licensed band that is integrated with a WLAN radio configured to be used as a Secondary-access Cell (SCell) configured to communicate in an unlicensed band.

In one embodiment, the 3GPP's WWAN technology, such as 3GPP LTE Release 8 or Release 10, or High Speed Packet Access (HSPA), can be used to provide a Primary Cell (PCell) to supply network connectivity, mobility, security and state management to user terminals. The framework can then be extended by using one or more WiFi links integrated with the WWAN radio that are opportunistically turned on, configured, and used to provide a Secondary extension carrier (SCell) supplying additional capacity in the data plane. While the combination of LTE and WiFi is disclosed, the same principles can be used for any WWAN technology in combination with a WLAN/WPAN system, as previously discussed.

In a 3GPP LTE system, when carrier aggregation is configured, the mobile wireless device, referred to user equipment (UE), only has one radio resource control (RRC) connection using the PCell with the network. At RRC connection establishment/re-establishment/handover, one serving cell provides the non-access stratum (NAS) mobility information, such as the tracking area identity. At RRC connection re-establishment/handover, one serving cell provides the security input. This cell is referred to as the Primary Cell (PCell). In the downlink, the carrier corresponding to the PCell is the Downlink Primary Component Carrier (DL PCC) while in the uplink it is the Uplink Primary Component Carrier (UL PCC).

Depending on UE capabilities, Secondary Cells (SCells) can be configured to form together with the PCell a set of serving cells. In the downlink, the carrier corresponding to an SCell is a Downlink Secondary Component Carrier (DL SCC) while in the uplink it is an Uplink Secondary Component Carrier (UL SCC).

The PCell can be configured as an anchor cell in the WWAN radio for mobile wireless devices operating within the PCell's operating range. The PCell can be an always-on connection between the mobile wireless device and the eNB, allowing the mobile wireless device to maintain a connection with the WWAN. In an embodiment using a 3GPP based PCell, cell selection and network entry, as depicted in block 110 of FIG. 1, can begin with a PCell based on criteria and procedures specified in the 3GPP Release 8, Release 9, Release 10, or Release 11. The PCell can be used to affect network entry of a mobile device, such as a UE, into a WWAN, security association, capability exchange, and mobility support, if needed. Such criteria and procedures can be used independently of whether and when a cross cell/Radio Access Technology (RAT) operation is subsequently initiated.

When an eNB requests an SCell to be configured, the PCell can turn on a WiFi radio integrated with the WWAN radio (in the integrated eNB), if necessary, as shown in block 120. In one embodiment, inter-RAT capabilities and configuration options for cross cell operations can be negotiated through the PCell. For example, the inter-RAT capabilities and configuration options for cross cell operations can be negotiated between an eNB and a UE. The eNB can provide WWAN network connectivity and maintain the state and mobility control of the UE through the PCell. The PCell can also carry control channels used for normal PCell assignments and for cross-cell assignments. The PCell may also carry some of the UE service flows, such as low latency services like voice data.

The SCell can be configured to provide access for a dual mode mobile wireless device to a WLAN radio access point. The connection between the mobile wireless device and the WLAN radio access point can be an "on-demand" opportunistic type of connection. When communication between the mobile wireless device and the eNB via the PCell is in need of additional bandwidth, the eNB can communicate with the WWAN radio via the PCell to create an SCell connection with the WLAN access point to offload some data traffic flows to the SCell to provide a desired amount of additional bandwidth capability for the dual mode mobile wireless device without requiring the use of additional bandwidth in the licensed spectrum (or freeing up some bandwidth in the licensed spectrum).

The SCell can be established, configured, and used for cross carrier allocations in the data plane through the PCell. The SCell allocations are opportunistic, and may be initiated only when needed, such as when there is a high level of traffic or interference/congestion conditions exist in the WWAN radio access network. The opportunistic allocations from the SCell may also be provided at additional opportunities, as can be appreciated.

The SCell can be configured with assistance from the PCell to provide discovery and selection information, as shown in block 130. SCell configuration information, such as WiFi configuration information, may be broadcast or multicast from the eNB to all relevant dual mode wireless mobile devices. The relevant mobile devices can include all mobile devices within a range of the eNB. Alternatively, the configuration information may only be sent to those mobile devices that are dual mode devices capable of communicating with a selected WLAN access point, or another desired selection metric.

In another embodiment, the configuration information can be communicated to selected mobile devices, such as UEs, through dedicated Radio Resource Control (RRC) signaling. Radio Resource Management (RRM) measurements made on the SCells can be reported on the SCell or the PCell. Transmitting WiFi configuration information on the PCell can provide the mobile wireless device(s) with sufficient configuration information to allow the mobile wireless devices to quickly tune and associate with a target SCell WiFi radio access point in either an adhoc mode or an infrastructure mode.

Once the SCell has been configured, a data link in an unlicensed band between a dual mode wireless device and the WiFi radio access point via the SCell can then be opportunistically activated by the PCell, as shown in block 140 of FIG. 1. The activation of the SCell marks the start of frequent cross cell measurements of the SCell by the PCell. The cross cell measurements can be used to facilitate a desired level of QoS management by the PCell of the unlicensed band connection provided by the SCell. The cross cell measurement and reporting is carried by PCell RRC connection. The activation step shown in block 140 may be simplified and combined with the configuration step in block 130 to minimize impacts to the media access control (MAC) layer of the PCell. The cross cell measurements will be discussed more fully below.

Block 150 of FIG. 1 illustrates that the PCell can allocate cross cell resources for the PCell and SCell. In one embodiment, the SCell may be used to carry traffic flows to/from the UE in unlicensed bands that were originally intended to be carried by the PCell on licensed bands. Alternatively, the flows may be partitioned amongst the PCell and SCell, depending on the QoS available on each carrier in the licensed and unlicensed bands. In another scenario, only selective flows may be offloaded to the SCell while the remaining traffic flows may continue to be supported by the PCell using a licensed band.

WiFi native measurements or WiFi RRM and Quality of Experience (QoE) measurements can be reported on the PCell. Based on channel conditions, load patterns, and operator policies, selective flows can be moved from the PCell using licensed spectrum to the SCell using unlicensed spectrum and vice versa. The network and the UE can be configured to support additional logic including additional signaling, buffering, and synchronization required to move the service flows between the PCell and SCell.

When conditions such as a need for higher QoS or greater bandwidth for the UE no longer hold, the SCell can be de-configured. De-configuration can involve turning off the WiFi radio at the UE to help save power usage at the UE and avoid unnecessary interference with other WiFi nodes.

In one embodiment, a UE connected to an eNB via a PCell may only turn the WiFi data link on if it is directed to do so by the eNB via the PCell or through user intervention for other WiFi usage (such as user directed WiFi usage). For simplicity of operation in a given UE, the WiFi interface may either be in an SCell mode or act as an independent interface. When the WiFi interface is in the SCell mode, it can be controlled by the PCell, as previously discussed. When it is in an independent mode, then the WiFi radio may not be under the control of the PCell. The WiFi interface will not typically be in both the SCell mode and the independent mode at the same time.

The WiFi radio access point that is integrated with eNB to provide an SCell connection with the UE may also be de-configured and turned off if it has been deactivated for all UEs and is not expected to be used. Such de-configuration does not impact network connectivity for any UEs since they are still maintained through the PCell based on a selected standard, such as 3GPP LTE. The de-configured WiFi radio may be turned back on later as the need arises.

PCell and SCell Architecture

In order to implement a WWAN radio operable to be used as a PCell that is integrated with a WLAN radio operable to be used as an SCell that is configured through the PCell, various architectural limitations exist due to the relatively low power and short range of a typical SCell configured to communicate in an unlicensed band. For example, the IEEE 802.11n specification represents one of the longer range specifications for the communication of data in an unlicensed spectrum, with a range of approximately 250 meters (820 feet). In contrast, typical base stations, such as an eNB, may have an effective range of several kilometers. To accommodate the integration of the WWAN and the WLAN, several architectures may be used.

FIGS. 2a-2c illustrates three different example architectures. FIG. 2a illustrates an example 3GPP LTE system in which an eNB 205 is connected to a core network 204 through a wired or wireless connection, as defined in the 3GPP LTE specification. The core network 204 can include a serving gateway and a Packet Data Network (PDN) gateway. In this example, the eNB 205 is directly integrated with a WLAN Radio comprising an IEEE 802.11 compliant access point, illustrated as a WiFi radio 206. The eNB carries the PCell which is maintained as an "always on connection" 213 with a UE 208 with an integrated 3GPP radio. The WiFi radio 206 carries the SCell and maintains an on-demand connection 211 with a WiFi radio 210 integrated with the UE 208.

In order to allow the eNB 205 and the WiFi radio 206 to communicate to form the on-demand SCell connection 211, the eNB can have a range that is approximately equal to or less than a range of the WiFi radio. For example, the WiFi radio may be an 802.11n radio that has a maximum range of approximately 250 meters. The eNB can be a micro-cell, a femtocell, a home eNB gateway (HeNB GW), or other type of WWAN access point that has a range of about 250 meters or less.

Alternatively, the WiFi radios 206, 210 that are used to support the SCell connection 211 may have a longer range. For example, the WiFi radios 206, 210 may be based on the IEEE 802.11y-2008 standard that offers an extended range at 3.7 GHz of approximately 5,000 meters (5 kilometers) radius from the integrated WiFi radios. The WWAN 205 radios integrated in the eNB 205 and the UE 208 can be configured to have a similar 5 kilometer range. While a single WiFi access point is illustrated in FIGS. 2a-2c, each eNB may be coupled with a plurality of WiFi radios, or other types or radios configured to communicate in unlicensed bands, as previously discussed. The plurality of unlicensed radios can be used to accommodate high levels of traffic from a plurality of mobile wireless devices (i.e. UEs). In one embodiment, the WLAN access point 206 can include two or more different types of radios configured to communicate in an unlicensed spectrum. For example, the WLAN access point may include a WiFi radio and a Bluetooth radio. The PCell connection 213 can be used to control offloading of data flows to at least one of the WiFi radio, the Bluetooth radio, or even both simultaneously.

In another embodiment, FIG. 2b illustrates an example of a different architecture, wherein an eNB 212 is connected to a core network 214 through a wired or wireless connection, as previously discussed. The eNB can be configured to serve a large area, such as a radius of multiple kilometers. The eNB can be connected to a plurality of integrated relay nodes 217.

In the example architecture of FIG. 2b, each integrated relay node 217 is comprised of a relay node 215 integrated with a WiFi radio 216 or another type of WLAN radio. Each WiFi access point 216 can be used to create one or more SCells to provide bandwidth in an unlicensed band. Each relay node can be configured to relay an UL PCC and a DL PCC between the eNB 212 and a mobile wireless device such as a UE 218. The UE can communicate with the WiFi access point 216 via an SCell over a selected radius. As previously discussed, the communication range of the WiFi access point may vary from a few dozen meters to thousands of meters, depending on the type of radio used to communicate via an unlicensed band. While a WiFi access point is used in this example, other types of unlicensed radios may be used to form the SCell connection as well, as previously discussed.

Each relay node 215 in FIG. 2b, carrying a UL PCC and a DL PCC via the PCell, can maintain an always-on connection 223 with a UE 218 with an integrated WWAN radio. Each relay node 215 can also communicate with the eNB 212. The WiFi access point 216 can form an on-demand connection 221 with a WiFi radio 220 integrated with the UE 218 to provide additional bandwidth in an unlicensed band. The on-demand connection can be managed via the PCell 223.

An additional example architecture is illustrated in FIG. 2c. An eNB 222 is connected to a core network 224 through a wired or wireless connection, as previously discussed. The eNB can be configured to serve a large area, such as a radius of multiple kilometers. The eNB can be connected to a plurality of integrated Remote Radio Elements (RREs) 227. The term RRE, as used herein, can be synonymous with a Remote Radio Head (RRH) or a Remote Radio Unit (RRU). Unlike a relay, the RRE/RRH/RRU can perform some processing of the component carriers prior to communicating them to the eNB.

In the example architecture illustrated in FIG. 2c, the integrated RRE is comprised of one or more RREs 225, 235 that are integrated with WiFi radio nodes (access points) 226, 236 respectively. The WiFi radio nodes 226, 236 can each form one or more SCells with the eNB 222. Alternatively, each RRE may only be a WiFi radio. Each RRE 226, 236 can be connected to the eNB via a radio over fiber connection 229, 239 or another type of broadband connection.

The eNB 222 can form an always-on connection 233, 243 with each UE 228, 238 respectively via a PCell. An on-demand connection 231, 241 can be formed between WiFi radios 226 and 236 via an SCell through the WiFi radios 230, 240 that are integrated with the WWAN radios at a UE 228, 238 respectively to provide additional bandwidth in an unlicensed band to the UE. The integrated RRE 227 can include an eNB in communication with multiple integrated RREs and WiFi access points. An SCell can be selectively activated at the UE by the eNB via one of the WiFi radios based on the UE's location relative to the integrated RREs.

FIGS. 2a-2c provide several example architectures in which a WWAN radio, such as a 3GPP LTE radio or a WiMAX radio, is integrated with an WLAN radio, such as a WiFi radio or a Bluetooth radio, to provide tighter coordination between the use of licensed spectrum via a PCell operating in the WWAN and the use of unlicensed spectrum via an SCell operating in the WLAN. The integration can provide interfaces to better manage the WLAN offload experience, without significant changes in other parts of an operator's network. These examples are not intended to be limiting. Other types of architectures that allow a PCell configured to communicate in a licensed band to be integrated with an SCell configured to communicate in an unlicensed band can also be formed, as can be appreciated.

In each of the example architectures of FIGS. 2a-2c, the WiFi connection can be established to carry the SCell in an infrastructure mode or as an adhoc connection between the WiFi access point and the UE (such as WiFi Direct). The WiFi radio transmission and/or reception on both the access point and the UE side can be turned on and off as controlled via the PCell such that unnecessary interference is avoided and power consumption is reduced.

There are numerous advantages created when integrating the WWAN and WLAN radios, in both a mobile device such as a UE, and a base station such as an eNodeB. For instance, the WWAN and WLAN operations can be integrated to support a dynamic adjustment of flows. An increased radio access network (RAN) spectrum capacity is provided, by offloading WWAN traffic to the unlicensed WLAN spectrum, with no impact on the core networks of the WWAN. The integration can be configured such that the core network is largely unaware of the WLAN. This can result to a reduction in capital expenditure and operating expenditure. The same core network components can be used "as is", without the need for new components. A tight integration and control can be obtained to better manage quality of service (QoS) and flow specific properties for efficient offload. In addition, a single IP address for a UE can reduce impacts in mobility management. Additional advantages are also provided, as can be appreciated.

Examples are provide in the proceeding paragraphs that include functional elements, message flows, and message structures to enable the functionality of the integrated WLAN and WWAN radios. These examples are not intended to be limiting. The integration of the WWAN and WLAN radios can be accomplished in a variety of fashions, depending on system specifications, costs, and other factors, as can be appreciated.

Figure 2:
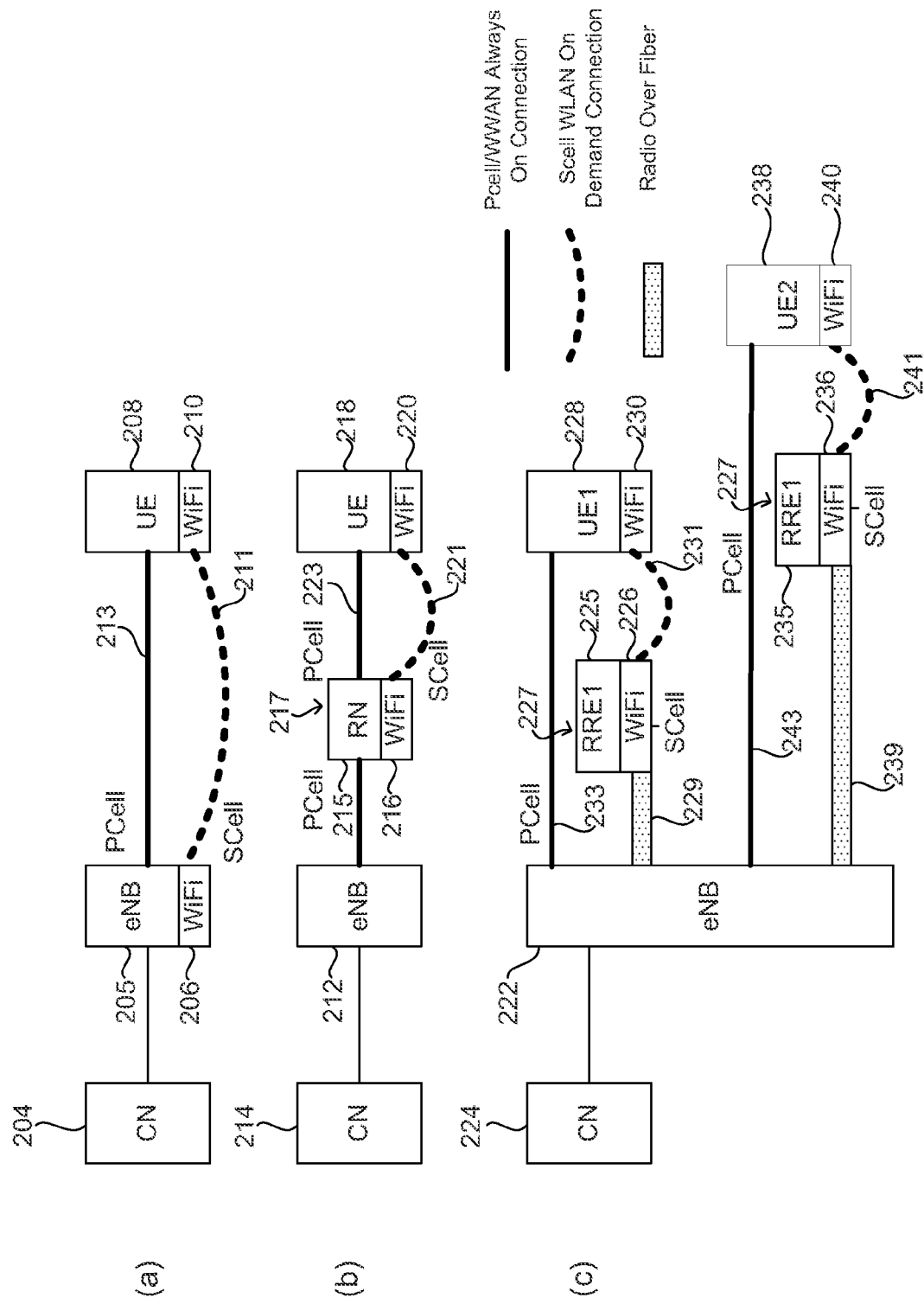
FIG. 2*a* illustrates a block diagram of a first architecture of a base station having an integrated PCell and SCell in accordance with an example.
FIG. 2*b* illustrates a block diagram of a second architecture of a base station having an integrated PCell and SCell in accordance with an example.
FIG. 2*c* illustrates a block diagram of a third architecture of a base station having an integrated PCell and SCell in accordance with an example.
Figure 3A:
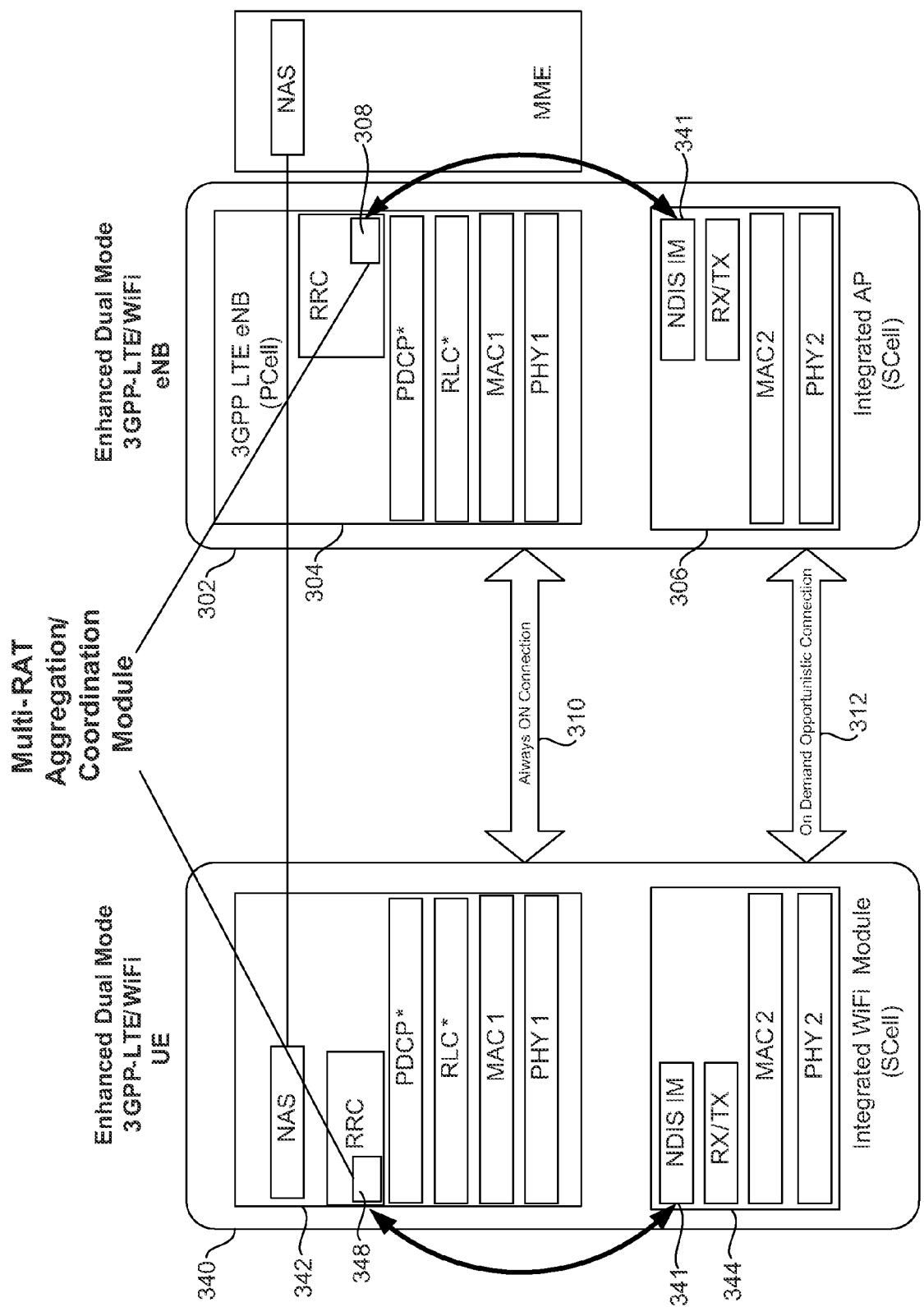
FIG. 3*a* illustrates a block diagram of a base station having a PCell integrated with an SCell in communication with a dual mode wireless device in accordance with an example.

FIG. 3a illustrates one example of a dual mode base station 302 having a WWAN radio 304 (configured to be used as a PCell) integrated with WLAN access point 306 (configured to be used as an SCell). The PCell can form an always-on connection 310 in a licensed band with a dual mode mobile wireless device 340 to connect the device 340 with a WWAN through a core network, as shown in FIG. 2. The WWAN radio 304 can control the integrated WiFi radio to form an SCell as an on-demand opportunistic connection 312 with the dual mode wireless device 340 in an unlicensed band.

In the example illustrated in FIG. 3a, the base station 302, is an enhanced dual mode 3GPP LTE/WiFi eNodeB. The mobile device 340 is an enhanced dual mode 3GPP-LTE/WiFi dual mode mobile wireless device. As previously discussed, the WWAN radio 304 in the dual mode eNodeB can include any type of radio configured to connect a mobile wireless device to a WWAN, such as a 3GPP LTE radio, a WiMAX radio, or the like. The WWAN is typically configured to operate in a licensed spectrum. However, it is possible that a WWAN may be formed to operate in the unlicensed spectrum using, for example, a radio configured to operate based on the IEEE 802.11y specification. The WLAN radio 306 integrated in the dual mode eNodeB 302 can include any type of radio configured to connect a mobile wireless device to a WLAN, such as a WiFi radio, a Bluetooth radio, a 60 GHz radio, and the like. The WLAN radio will typically operate in an unlicensed spectrum.

The mobile wireless device 340 in this example is an enhanced dual mode 3GPP LTE/WiFi UE. However, the mobile wireless device can be any type of device that includes at least a WWAN radio 342 configured to form an always-on connection 310 via a PCell and a WLAN radio 344 that is controlled by the WWAN radio via the eNB 302 to form an on-demand opportunistic connection 312 to carry an SCell to allow data flows to be offloaded from the always-on connection to the on-demand connection and/or carried by the on-demand connection instead of the always-on connection.

The WWAN radio 304 in the eNB 302 and the WWAN radio 342 in the UE 340 can each include a physical layer (PHY 1), a media access control layer (MAC 1), a radio link control layer (RLC), a packet data convergence protocol layer (PDCP), and a radio resource control (RRC) layer. At the RRC layer, a multi-Radio Access Technology (RAT) carrier aggregation (MRCA) module 308 in the WWAN radio 304 is configured to communicate with the unlicensed spectrum WLAN radio 306 at the eNB 302. The MRCA module can coordinate the use of the SCell to transmit and receive data via the unlicensed spectrum, as previously discussed. The MRCA module enables data to be communicated on an on-demand basis over the WLAN via an L2 (layer 2) transport link. The MRCA module 348 in the UE 340 can perform similar functions to enable the WWAN radio 342 and the WLAN radio 344 to communicate to allow the data flows to be partitioned amongst the PCell and SCell as previously discussed. The function of the MRCA module will be discussed more fully below.

FIG. 3a shows one example in which the MRCA module 308 in the WWAN radio 304 can route selected flows service data units (SDU) from the PDCP layer to the Network Driver Interface Specification (NDIS) Intermediate Driver (IM) 314 in the WLAN radio 306. The data can then be communicated by the WLAN radio via the L2 transport connection. A WLAN driver in the WLAN module at the dual mode wireless UE 340, such as the NDIS IM driver 341 can segregate this traffic based on the source MAC address of the WLAN radio on the network. This MAC address can be included in all data packets received by the WLAN driver at the dual mode mobile wireless device.

Uplink packets on the dual mode mobile wireless device 402 can be transferred from the WWAN to the WLAN driver stack. For example, FIG. 3a provides one example, wherein the uplink packets can be transferred from the MRCA module 348 in the WWAN radio 342 to the Network Driver Interface Specification (NDIS) Intermediate Driver (ID) 341 of the WLAN radio 344.

Figure 3B:
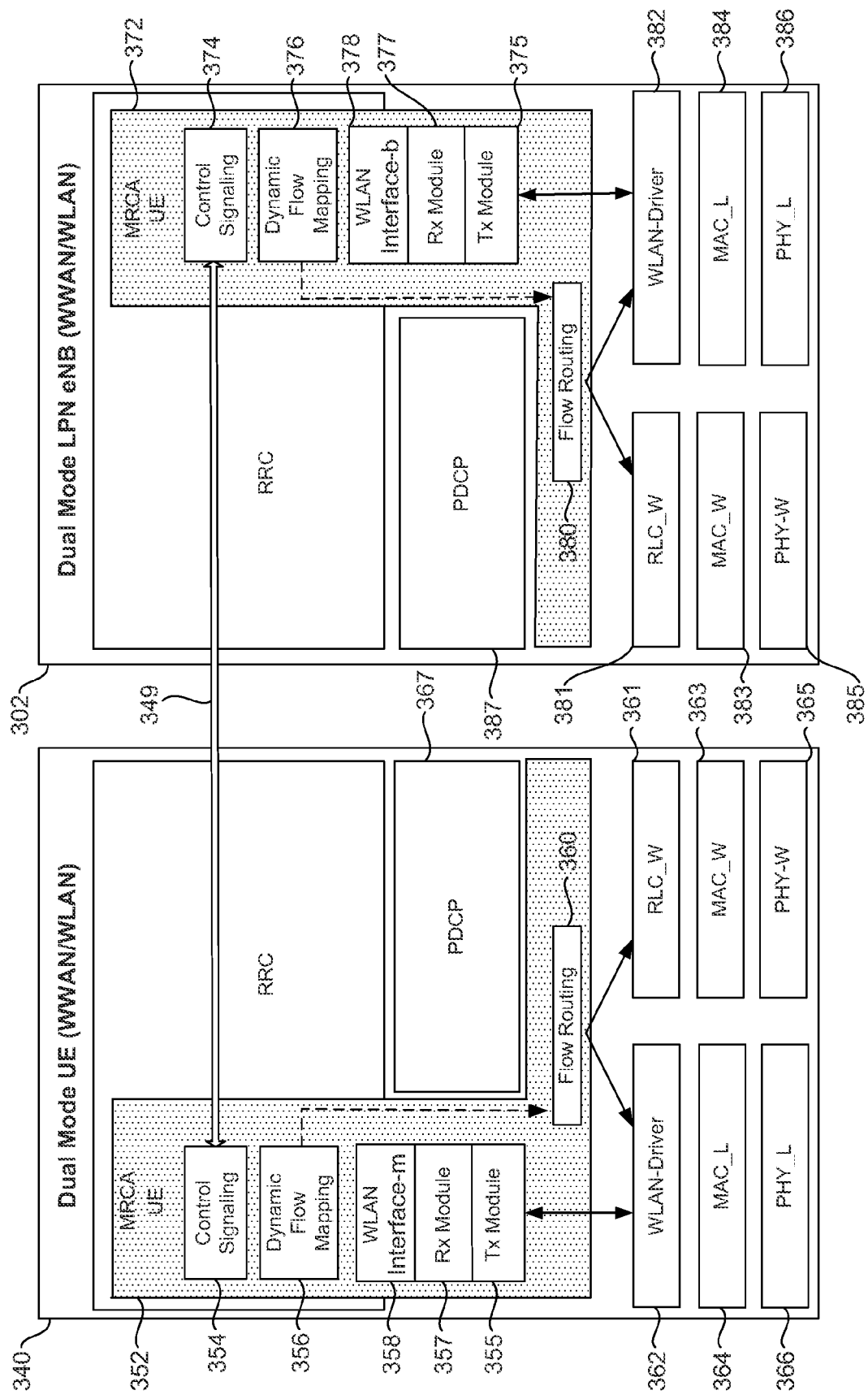
FIG. 3*b* illustrates a block diagram of a multi-Radio Access Technology (RAT) Carrier Aggregation (MRCA) module integrated in a dual mode wireless device and a dual mode eNodeB in accordance with an example.

FIG. 3b provides an example of the interaction between the MRCA module 352 operating in a dual mode UE, such as a UE, and an MRCA module operating in a dual mode base station, such as an eNodeB with one or more integrated WiFi access points. FIG. 3b shows the interaction between the MRCA and other functions in the user plane and control plane.

Each MRCA module 352, 372 can include a control signaling module 354, 374, a dynamic flow mapping module 356, 376, and a flow routing module 360, 380. A WLAN interface module 358, 378 is configured to allow the MRCA module to interact with the drivers in the dual mode UE and base station, respectively. The drivers can include a WLAN DRIVER 362, 382; a medium access control (MAC) protocol driver 364, 384 for the WLAN radio, a physical (PHY) layer driver 366, 386 for the WLAN radio, a MAC protocol driver 363, 383 for the WWAN radio, and a PHY layer driver 365, 385 for the WWAN radio. The decomposition of the MRCA and its key functionalities will be discussed in the proceeding paragraphs.

Control Signaling

The control signaling module 354 operates on the control plane. The control signaling component of the MRCA module on the dual mode base station interacts with the corresponding function on the dual mode UE. In one embodiment, the control messages can be communicated between the dual mode UE and the dual mode base station via a high level signaling connection over the PCell WWAN radio connection. For example, in one embodiment the control signaling can be communicated via radio resource control (RRC) signaling 349. The control signaling can send control plane messages over the WWAN radio connection to initiate and/or terminate and control an offload of data flows from the WWAN radio connection to a WLAN radio connection, such as the on-demand opportunistic connection 312 illustrated in FIG. 3a. All RRC control signaling can be handled by the control signaling module 354, 374. The flow for the WLAN offload process using these messages and the messaging semantics are described in the following sections.

Dynamic Flow Mapping

The dynamic flow mapping module 356, 376 can be configured to operate in the control plane. The dynamic flow mapping module can create and update mapping tables of service flows to the WWAN or WLAN.

In one embodiment, a flow-mapping table within the MRCA can have an entry for each service flow. Based on the entry in the table, the MRCA in the data plane can route the packets corresponding to each flow to the respective WWAN or WLAN bearers when WLAN Carrier Aggregation is enabled. Within the WWAN radio and the WLAN radio, the flow handling can be performed according to existing specifications.

In one embodiment, the flow-mapping table can include information about a Quality of Service (QoS) Class Identifier for packets in the data flows. The QCI is defined by the 3GPP Rel. 10. The QCI is a scalar parameter of the QoS profile of an Evolved Packet System (EPS) bearer. The QCI is a scalar which refers to access node-specific parameters that control bearer-level packet forwarding treatment, such as scheduling weights, admission thresholds, queue management thresholds, link layer protocol configurations, and so forth. The QCI value is associated with packets communicated on the WWAN radio link. Each packet flow is mapped to a single QCI value Packets carried on a WLAN radio link, such as a WiFi radio link, are communicated based on a QoS identifier. QoS is a descriptor of the level of performance provided in transmission of data. Typical QoS metrics include bit rate, delay, bit/block error rate, maximum blocking probability and outage probability. QoS guarantees are especially important for real-time streaming applications, such as Voice over Internet Protocol (VoIP), since these are often delay-sensitive.

An instance of the flow-mapping table can be maintained at the eNodeB for all downlink and uplink flows and another identical instance can be kept and updated by the UE. The eNodeB can make flow mapping decisions and can send updates of the flow-mapping table to the UE when the eNodeB makes any changes to the table. The UE can be configured to send a request to the eNodeB for the flow-mapping table for such updates.

Alternatively, a UE based decision approach can be used where the UE can make a decision and inform the eNodeB of such updates to the flow-mapping table instance at the eNodeB. In either case the eNodeB and the UE can be configured to working together to have the same flow mapping table.

Table 1a shows some examples of parameters which may be maintained by the dynamic flow mapping module 356, 376. Table 1b illustrates an example of information passed to the Flow Routing module 360, 380 and to the WLAN Driver 362, 282 through the WLAN interface 358, 378.

TABLE 1a

Mapping flows to bearers on different access networks

| Flow Identifier | Flow Bit Rate | QCI | Bearer Type | Bearer WLAN/WWAN |
|---|---|---|---|---|
| Identifies individual flows at RRC level | Bandwidth allocated to each flow | 1-3: WWAN 4-9: WLAN | GBR, NGBR | WWAN/WLAN |

TABLE 1b

Flow Mapping tables as Passed to WLAN TX/RX Module

| Flow Identifier | WiFi QoS |
|---|---|
| Identifies individual flows at RRC level | WIFI QoS Class 1-4 |

As illustrated in Table 1a, the flow-mapping table can include a flow identifier parameter that is used to identify individual flows at the RRC level. A flow bitrate parameter can designate a bandwidth allocated to each flow. A QCI parameter can designate a 3GPP/WWAN Quality of Service (QOS) Class Identifier (QCI) and identifies the service type associated with the flow. In this example, selected QCI values can be designated to be associated with communication via a WWAN radio connection, while other QCI values can be designated to be associated with communication via a WLAN radio connection.

In the example of Table 1a, QCI valued 1-3 are associated with a WWAN radio connection between the UE and the eNodeB. QCI values 4-9 are associated with a WLAN radio connection between the UE and the eNodeB. This is not intended to be limiting. The actual constraints can be system dependent. Certain flow types, such as conversational voice and real time traffic may always be sent through the WWAN radio connection. Other flow types such as video streaming, web browsing and other best effort traffic may be routed through WLAN bearers on the WLAN radio connection. The flow bandwidth and type of bearers (Guaranteed/Non-guaranteed bit rate) can also aid in the decision process as to whether a selected data flow should be offloaded and/or assigned to be communicated on the WWAN bearer or the WLAN bearer. The examples in Table 1 are not intended to be limiting. Additional parameters may also be used in the decision process, as can be appreciated.

Data transmitted on the WWAN is communicated based on a QCI for each data flow. However, a different metric, QoS, is used for data transmitted via a WiFi connection. In order to offload data from the WWAN, which determines a quality of a data flow based on QCI, to the WLAN, the QCI value for each service flow can be mapped to QoS classes supported by the WiFi Driver. Such mapping can be passed to the WiFi driver for each flow. In one embodiment, this mapping can be static. The mapping of flows from QCI to QoS can be configured when flow switching is enabled. For example, one such mapping can be: 3GPP QCI 4, 5 map to WiFi QoS Class 1, QCI 6 maps to WiFi QoS Class 2, QCI 7 maps to WiFi QoS Class 3, QCI 8, 9 map to WiFi QoS class 4. Some WiFi drivers may only have 2 QoS classes implemented, in which case the mapping would be adjusted. The actual mapping is dependent on system design and architecture.

Flow Routing

The flow routing module 360, 380 can be configured to operate in the data plane. The flow routing module can route data communicated via the packet data convergence protocol (PDCP) service data units (SDUs) to the WWAN and WLAN.

On the user plane for downlink traffic, the flow routing module looks at individual flow packets arriving from the PDCP and determines whether the individual packet needs to be sent through the WWAN or the WLAN. Such mapping is provided to WLAN TX/RX modules using information such as the information shown in the example of Table 1b. A flow identifier value can be used to identify individual flows at an RRC level. A WiFi QoS value can be designated based on the QCI value, as previously discussed. In this example, each service flow communicated to the WLAN can be designated a WiFi QoS class from 1 to 4. Conversely, a flow received by the WLAN receiver module can have a WiFi QoS class 1-4 already assigned. If the packet needs to be sent through a WWAN radio connection, the packet can be sent to a radio link controller (RLC). Otherwise, the packet can be sent to a WLAN transmitting module.

WLAN Interface

A WLAN interface module 358, 378 can be configured to operate in the control plane to perform setup and monitoring functions. The WLAN interface module can operate in the user plane to perform transmit and receive handling. This will be discussed in the proceeding paragraphs.

WLAN Setup and Monitoring

In the example of FIG. 3b, the WLAN interface module 358, 378 for the dual mode UE and the dual mode eNodeB is configured to communicate with the WLAN driver 362, 382 respectively. This communication path enables the WLAN interface module to perform setup and monitoring via the control plane.

The WLAN setup and monitoring component on the eNodeB 302 is responsible for turning on/off one or more WLAN access points that are integrated with the eNodeB. The component can be configured to collect statistics from the integrated WLAN access point(s). In addition, the setup and monitoring component can be used to evaluate and/or monitor a link quality of the WLAN. If the link quality of the WLAN falls below a certain threshold this component can notify the control signaling module 374. The control signaling module can then use the link quality information to disable the WLAN offloading. A flow mapping table can be update accordingly on both eNodeB and the UE side. The use of flow mapping will be discussed more fully below.

On the UE 340 side, the WLAN setup and monitoring component is configured to turn the WLAN on and/or off and provides the WLAN discovery and selection assistance information that is received from the eNodeB 302 to the WLAN device driver 362. The WLAN setup and monitoring component also collects WLAN metrics and statistics both in the pre-association and post association phases from the WLAN driver. All WLAN measurements for quality of service (QoS) evaluation can be collected by this module by interfacing with the WLAN driver 362. These measurements can be sent to the eNB in an RRC message by the Control Signaling Module 354. The UEs can collect information about loading on local APs and can send this to eNBs to assist them with appropriate AP selection as well.

WLAN Receive Module

The WLAN receive module 357, 377 is part of the WLAN interface module 358, 378 at the UE 340 and eNodeB 302 respectively. The WLAN receive module can be configured to operate on the user plane for packets arriving from the WLAN interface. On the eNodeB side 302, the WLAN receive module can receive all of the uplink packets. On the UE side, the WLAN receive module can receive all of the downlink packets from the WLAN interface. In one embodiment, the WLAN receive module interacts with the WLAN device driver in an operating system (OS) specific manner to receive all WLAN packets. For example, when operating the Windows® operating system, the WLAN receive module can act as an upper layer network driver interface specification (NDIS) protocol driver. The WLAN receive module can establish a binding with a lower layer WLAN miniport driver. When packets are received, they can be sent to the PDCP 367, 387. The WLAN driver 362, 382 can send a service data unit (SDU) with data payload to an upper layer protocol driver, where the data payload can be received as a packet data unit (PDU).

The WLAN receive module typically does not perform any additional functionality on service data units such as packet reassembly or sequencing since the WLAN MAC already performs these functions.

WLAN Transmit Module

The WLAN transmit module 355, 375 is part of the WLAN interface module 358, 378 at the UE 340 and the eNodeB 302 respectively. The WLAN transmit module can be configured to operate on the user plane for sending packets using the WLAN interface. On the eNodeB side, the WLAN transmit module is configured to send downlink packets. On the UE side, the WLAN transmit module is configured to send the uplink packets using the WLAN interface module. The WLAN transmit module interacts with the WLAN device driver 362, 382 in an OS specific manner to send the WLAN packets. For example, when operating the Windows® operating system, the WLAN transmit module can act as an upper layer NDIS protocol driver and establish a binding with a lower layer WLAN miniport driver. When packets are received from the PDCP 367, 387 they are sent to the WLAN miniport driver. The WLAN transmit module does not perform any additional functionality on SDU such as segmentation or sequencing since the WLAN MAC already performs these functions.

WLAN QoS and Link Monitoring

A number of parameters can be monitored to perform quality of service (QoS) and link monitoring of WLAN radio connections that are setup between the UE 340 and the eNodeB 302 to offload traffic from the WWAN radio connection. The parameters can be obtained from the WLAN device driver 362, 382. The parameters include signal parameters such as: received signal strength indicator (RSSI), signal to noise ratio (SNR), percent missed beacons, percent transmit retries, percent transmit errors, and cyclic redundancy check (CRC) errors. Power level parameters, such as the transmit power level, as measured in dBm, can also be obtained from the WLAN device driver. This list is not considered to be exhaustive. Additional parameters can be monitored and communicated based on system design and setup.

In addition, the WLAN radio at the UE can send reports to the WLAN access point at the eNodeB. The reports can include the STA measurement report and the neighborhood measurement report. These reports are more fully described in the IEEE 802.11-2012 specification.

In accordance with one embodiment, a multi-radio access technology (RAT) Carrier Aggregation module is disclosed, as illustrated in FIG. 3b. The MRCA module can comprise a control signaling module in a wireless device that includes a wireless wide area network (WWAN) radio integrated with a wireless local area network (WLAN) radio. The term wireless device, as used herein, is inclusive of any type of wireless transceiver. The wireless device may be a mobile device, such as a UE, or a fixed wireless device, such as an eNodeB. The control signaling module is configured to communicate WWAN control signaling and WLAN control signaling from the wireless device via a WWAN radio connection of the wireless device. For example, if the MRCA module is located in a UE, the control signaling module is configured to communicate WWAN control signaling and WLAN control signaling from the UE to a dual mode eNodeB. If the MRCA module is located in an eNodeB, the control signaling module is configured to communicate the WWAN control signaling and WLAN control signaling from the eNodeB to a dual mode UE. Typically, both the dual mode UE and the dual mode eNodeB will include an MRCA module. The MRCA module further comprises a WLAN interface module configured to interface between the WWAN radio and the WLAN radio in the wireless device to communicate the control signaling communicated via the WWAN radio connection with the WLAN radio.

In one embodiment, the MRCA module can include a dynamic flow mapping module configured to form a flow-mapping table to dynamically map service flows between the WWAN radio and the WLAN radio in the wireless device. A flow routing module operating in a data plane of the wireless device is configured to route data packets to one of the WWAN radio and the WLAN radio in the wireless device based on the flow-mapping table to transmit and receive the data packets via the wireless device.

In one embodiment, the MRCA module is configured to operate in the wireless device, wherein the wireless device is one of a mobile wireless device, a fixed wireless device, a mobile station (MS), a user equipment (UE), a base station (BS), a node B (NB), an enhanced node B (eNB), a baseband unit (BBU), a remote radio head (RRH), a remote radio equipment (RRE), a remote radio unit (RRU), and combinations thereof.

In one embodiment, the control signaling module is configured to send control plane messages via radio resource control (RRC) signaling between a UE containing the MRCA module and an eNodeB containing the MRCA module via a WWAN radio connection formed between the UE and the eNodeB. The control plane messages are used to perform at least one of initiate data offload from the WWAN radio to the WLAN radio, terminate data offload, and control the data offload to the WLAN radio.

In one embodiment the WLAN interface module comprises a WLAN radio monitoring module configured to setup and monitor the WLAN radio on a control plane in communication with a WLAN device driver; a WLAN receive module configured to communicate packets received by the WLAN radio to the WLAN device driver; and a WLAN transmit module configured to communicate packets from the WLAN device driver to the WLAN radio for transmission.

In one embodiment, the dynamic flow mapping module of the MRCA module can be configured to operate in a control plane and create and update a mapping table for selected service flows to one of the WWAN radio and the WLAN radio. For each service flow of the mapping module the mapping table includes at least one of: a bandwidth allocated to each service flow; a quality of service (QoS) class identifier (QCI) associated with each service flow; a bearer type for each service flow; and a selected bearer for each service flow.

In one embodiment, the dynamic flow mapping module is configured to map the QCI associated with each service flow to a QOS class supported by a WLAN device driver. The flow routing module is configured to operate in a data plane to route flow packets arriving on a packet data convergence protocol layer for transmission via one of a radio link control on the WWAN radio and a WLAN transmitting module on the WLAN radio.

Procedures and Messaging Flow

Setting up a WLAN radio connection between the dual mode UE 340 and the dual mode eNodeB 302, and offloading traffic from a WWAN radio connection to the WLAN radio connection can involve a number of steps. FIGS. 4, 5, 6a, 6b, and 7 provide examples of steps that can be performed to offload traffic. While certain steps may need to be performed in a certain order, the numbering of these steps is not intended to require the steps to be performed in this sequence. They are merely shown in this sequence to facilitate an example illustration of these steps. Nor are the steps considered to be complete. One of skill in the art will understand that additional steps may be performed, while illustrates steps may be skipped in selected situations, depending on system design and software issues.

The examples for setting up the WLAN radio connection and offloading traffic is divided into four phases: a WLAN preparation phase designated Phase 0; a WWAN assisted WLAN discovery and association phase, designated Phase 1; a QoS monitoring and flow switching phase, designated Phase 2; and a termination of offload phase, designated Phase 3. These phases will be discussed in the proceeding paragraphs.

Phase 0

WLAN Preparation Phase

Figure 4:
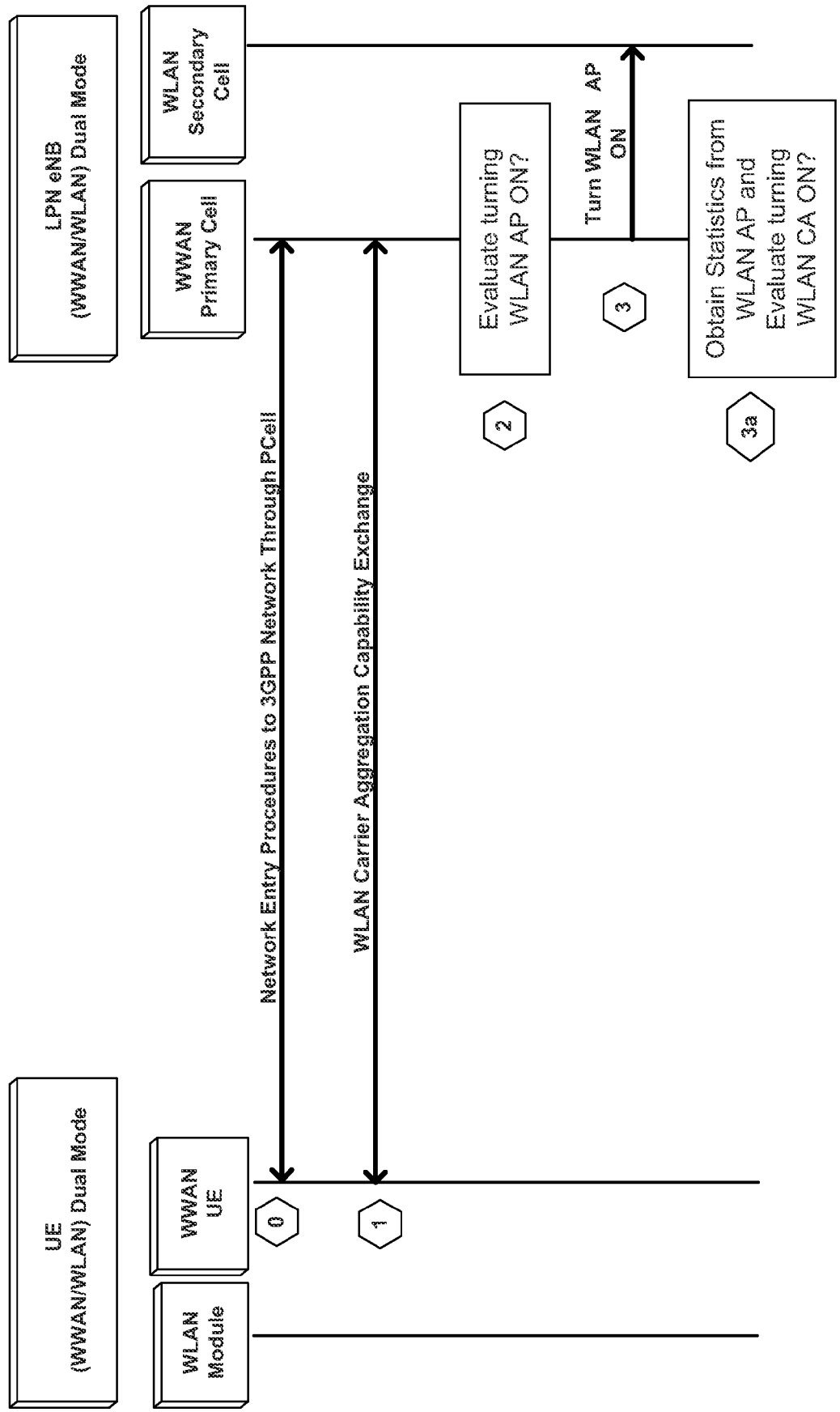
FIG. 4 illustrates a flow chart of steps involved in setting up a Wireless Local Area Network connection with the SCell in a dual mode eNodeB in accordance with an example.

FIG. 4 illustrates an example of a third generation partnership project (3GPP) entry and capability exchange to prepare the WLAN radios in the dual mode UE and the dual mode eNodeB to offload traffic from the WWAN to the WLAN.

In Step 0, a communication from the WWAN radio in the UE to the WWAN access point, designated as a PCell, is used to provide a typical 3GPP attach that includes network entry procedures to the 3GPP network through the PCell. The entry procedures are outlined in the 3GPP Technical Specification (TS) 23.401.

In Step 1, a WLAN carrier aggregation capability exchange is performed between the WWAN radio in the UE to the WWAN access point. In this step, the UE informs the WWAN network about its WLAN carrier aggregation capability.

In Step 2, an evaluation is made at the dual mode eNodeB as to whether to turn the integrated WLAN access point on. The eNodeB evaluates periodically if it is worthwhile to enable WLAN carrier aggregation. This decision is implementation specific and may take various factors into account. For example, one factor includes the data load on the WWAN radio network and possibly on the core network as well. If the load on the radio access network (RAN) is relatively high then WLAN carrier aggregation may be enabled to allow selected flows to be offloaded to the WLAN. However, if the load on the core network is also high, the operator may not enable WLAN carrier aggregation since it could possibly cause a greater load on the core network.

Another factor that can be taken into account to determine if the integrated WLAN access point at the eNodeB should be turned on is the number of UEs within the eNodeB's coverage area that can support WLAN carrier aggregation. If no UEs are within the coverage area then the WLAN access point may not be activated.

An additional factor can include the quality of service (QoS) for services offered to the target UEs. For instance, if the services offered to the target UEs are higher than the QoS available via a WLAN connection, then the WLAN connection may not be setup.

In step 3, once the evaluation is complete then the WLAN interface function may turn on the WLAN access point (AP) at the eNodeB. It should be noted that the eNodeB can include a plurality of integrated access points, and one or more of these access points can be evaluated and activated, as outlined in steps 1-3.

In step 3a, once the WLAN AP is turned on, information and statistics may be collected. The information and statistics can include information about channel interference in the area, the number of WLAN deployments, and so forth. Many of these factors are specific to implementations and deployments. The WLAN interface module 378 (FIG. 3b) can provide information collected by the WLAN access point(s) at the eNodeB to the control signaling module 374 in the MRCA module 372. This information can then be communicated to the MRCA module 352 in the UE 340 via RRC signaling 349 over the WWAN radio connection. The information communicated can depend on which access points are activated for offload, the number of UE's within the coverage area, and so forth.

Phase 1

WLAN Preparation Phase

Figure 5:
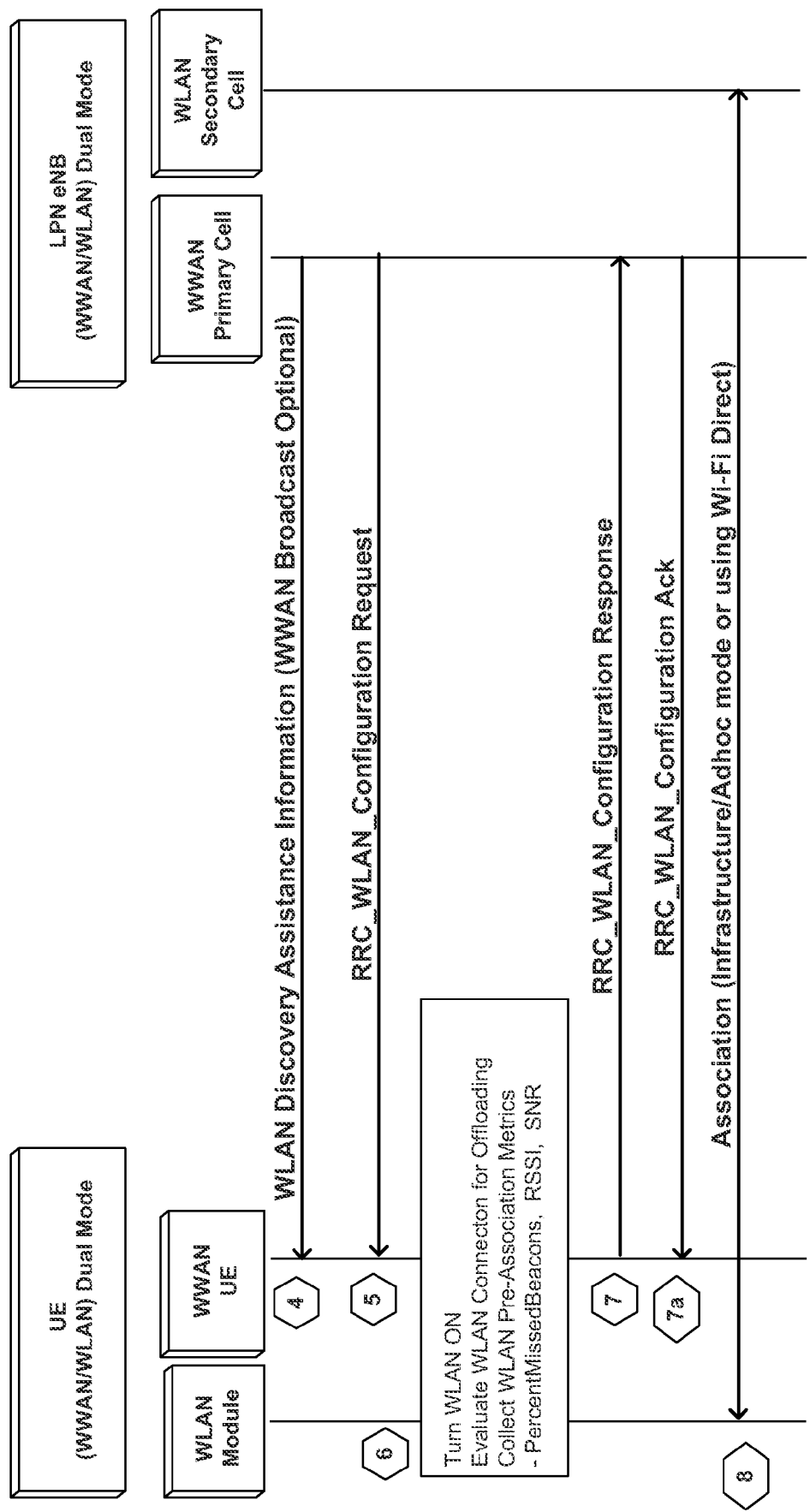
FIG. 5 depicts a flow chart of steps involved in a wireless local area network (WLAN) preparation phase for offloading data flows on a wireless wide area network (WWAN) to the WLAN in accordance with an example.

In Step 4, as illustrated in FIG. 5, WLAN discovery assistance information can be communicated from the dual mode eNodeB 302 to the dual mode UE 340 via a WWAN radio connection. At the eNodeB, the WLAN Setup and Monitoring entity in the WLAN interface module 378 can create a carrier aggregation network discovery and selection information that can be used by UEs within the eNodeB's coverage area. This information may be broadcast by the eNodeB over the WWAN air interface using system information blocks (SIBs). The information can also be sent to specific UEs using dedicated RRC signaling as part of step 5.

In step 5, the eNodeB can send an RRC_WLAN_Configuration Request message to the UE. This message is sent on the control plane of the WWAN. The eNodeB can include the Network Discovery information to further assist the UE in discovering and selecting a WLAN AP for offloading. The eNodeB can also request pre-association measurements from the UE which may include RSSI, Percentage of Missed Beacons, and SNR. Additional information may also be communicated that is implementation specific.

In cases where multiple access points are integrated with the eNodeB, the eNodeB can provide the UE with assistance information about some or all access points associated with the eNodeB in a selected order. For instance, the order may be based on a priority or a preference. Priority can be set based on the access point's loading and/or the access point's estimated proximity to the UE, among other factors. The AP loading information can be obtained by the UE from the APs and communicated to eNBs as well.

The configuration of access points can be considered a configuration of SCells, since each access point can be used as an SCell. Each configured WiFi access point can also be assigned a cell identifier. For instance, a 3 bit carrier indication field (CIF), as discussed in 3GPP LTE Release 10, may be reused. Alternatively, a base station identification (BSID) of the access point may be reused to allow follow up messaging with references to a specific access point.

One example of the RRC_WLAN_Configuration Request message is illustrated in FIG. 8a. The RRC_WLAN_Configuration Request message can be sent from the eNodeB 302 to the UE 340. The RRC_WLAN_Configuration Request message can include the WLAN configuration information for each of the access points that may be powered on at the eNodeB. This enables the UE to evaluate a potential connection to any of the access points. The eNodeB can also request measurements from the UE. If multiple integrated access points are included in this message, they can be listed in a selected order by the eNodeB, as previously discussed. In the example illustrated in FIG. 8a, four example elements are listed by attribute name, with definitions provided for each example element.

Returning to FIG. 5, in Step 6, once the UE receives the RRC_WLAN_Configuration Request message, the UE can power on the WLAN radio at the UE if it has not already been powered on. The UE can collect any pre-association statistics from the WLAN that were specified in the message and evaluate the feasibility of offloading data from the WWAN to the WLAN. The pre-association metrics may include a percent of missed beacons, the RSSI, and the SNR. Additional metrics may also be asked for, as can be appreciated. In one embodiment, the UE may decline the use of the WLAN radio, in this example WiFi, for various reasons. For instance, if the WLAN radio on the UE is already being used for some other purpose, or of the UE battery is low on power, then offloading may be declined by the UE.

Once the measurements are made, in Step 7 the UE sends the RRC_WLAN_Configuration Response message and includes the relevant information requested by the network for all access points included in the RRC_WLAN_Configuration Request message that have acceptable signal levels. The actual level that is considered acceptable is implementation specific.

One example of the RRC_WLAN_Configuration Response message is illustrated in FIG. 8*b*. The RRC_WLAN_Configuration Response message can be sent from the UE 340 (FIG. 3) to the eNodeB 302 (FIG. 3). The RRC_WLAN_Configuration Response message can include the WLAN BSSID for each of the access points listed in the RRC_WLAN_Configuration Request message. The RRC_WLAN_Configuration Response message can also include respective measurement information from the UE, if it is requested by the eNodeB. The UE may also indicate if it cannot enable WiFi radio for flow switching purposes. In the example illustrated in FIG. 8*b*, five example elements are listed by attribute name, with definitions provided for each example element.

In Step 7*a*, as illustrated in the example of FIG. 5, the eNodeB can evaluate the information sent by the UE and make a final decision on whether it is viable to enable WLAN offloading, and to which access points data will be offloaded. The eNodeB can send an RRC_WLAN_Configuration Acknowledgement (Ack) to the UE. The Ack can contain one access point, or an ordered list of access points, with which the UE can be associated.

One example of the RRC_WLAN_Configuration Ack is illustrated in FIG. 8*c*. The RRC_WLAN_Configuration Ack can be sent from the eNodeB 302 to the UE 340. The RRC_WLAN_Configuration Ack can include an indication if the UE should establish a WLAN connection with a target eNB WLAN AP or not. If multiple access points are listed, it implies that the UE can associate with any of them dynamically based on link conditions. In the example illustrated in FIG. 8*c*, four example elements are listed by attribute name, with definitions provided for each example element.

Returning to FIG. 5, in Step 8, and association can be formed between the WLAN module at the UE and the WLAN module at the eNodeB to set up a WLAN secondary cell that can be aggregated with the PCell to provide additional bandwidth in an unlicensed band in conjunction with the bandwidth provided by the PCell in a licensed band. In one embodiment, the UE will only initiate WLAN association upon receiving the RRC_WLAN_Configuration Ack message with the target WLAN AP, as directed by the eNB.

Once the target WLAN AP is discovered and selected, the UE can start association with that AP. The association step can be viewed as the SCell activation step in the carrier aggregation framework of the 3GPP LTE Release 10, which demarks the start of tighter link quality measurements and/or reports and readiness for data exchange. The association can be made in the infrastructure mode or a WiFi Direct connection based on a peer to peer (P2P) connection.

In cases where the eNodeB is integrated with multiple WiFi Aps, the UE can measure RSSI from all such APs and start association with one of the APs. The AP may be selected based on a variety of measurements including, but not limited to, the RSSI measurement results, loading, and so forth.

Phase 2

QoS Monitoring and Flow Switching

Figure 6A:
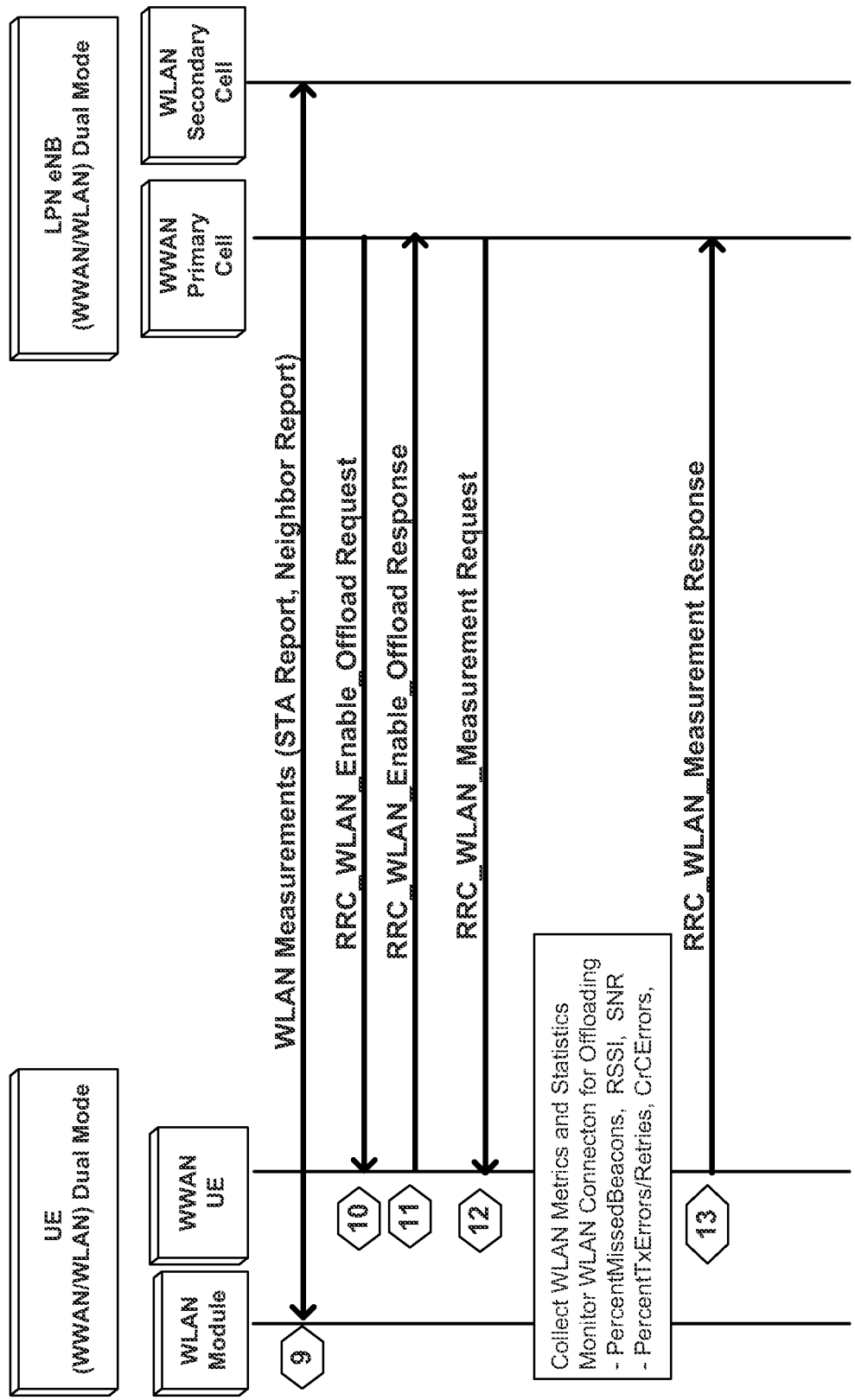
FIGS. 6*a* and 6*b* depict a flow chart of steps involved in quality of service monitoring of the WLAN radio connection and flow switching of the data flows in accordance with an example.

As illustrated in FIG. 6*a*, in Step 9 the WLAN station at the UE (STA) can send regular measurement reports to the WLAN AP at the eNodeB. As previously discussed, these measurement reports are specified in the IEEE 802.11-2007 specification. The reports include the STA measurement report and the neighborhood measurement reports. The WLAN setup and monitoring function in the WLAN interface module in the MRCA can evaluate specific parameters from these reports and make continual evaluation on the quality of the WiFi link between the UE and the eNodeB, thereby enabling an evaluation of the WiFi QoS. In one embodiment, the MRCA module can monitor the flow of packets on a packet by packet basis. Each packet can be directed to one of the WWAN radio connection or the WLAN (WiFi) radio connection. Monitoring the QoS on the WiFi connection enables the MRCA module at each of the UE and the eNodeB to determine if the WiFi connection is capable of providing the desired QoS based on the reports. If it is determined that the WiFi connection cannot provide the desired QoS, then the packets can be redirected over the WWAN PCell connection. For traffic flow types with substantially low latency data (i.e. a high QCI), such as voice data, the flows may be carried on the WWAN. Data types that allow greater latency may be offloaded to the WLAN.

In step 10, if the WiFi link quality and overall QoS is acceptable, and based on other considerations, the eNodeB can send out the RRC_WLAN_Enable_Offload Request to the UE. The message can include a flowID map, such as the flowID illustrated in the example in Table 1a, for downlink and uplink flows. The MRCA module on the UE can use the flowID map for routing the downlink and uplink flows to the WLAN link. As previously discussed, the flowID map can include information that allows the QCI values set for data flows designated for the WWAN radio link to be translated to appropriate QoS values for the WiFi link. This translation allows the data flows to be properly communicated on the WiFi link.

One example of the RRC_WLAN_Enable_Offload Request is illustrated in FIG. 8*d*. The RRC_WLAN_Enable_Offload Request can be sent from the eNodeB 302 to the UE 340. The RRC_WLAN_Enable_Offload Request can include an indication that offloading should be initiated. It also includes the identifier of the access point with which offloading should be initiated. If this access point is different than the access point with which the UE has already associated, then the UE may need to first disassociate with the current access point and then associate with the new access point. The eNodeB or the WWAN network may also specify mapping information for each of the downlink and uplink flows, as previously discussed. In the example illustrated in FIG. 8*d*, six example elements are listed by attribute name, with definitions provided for each example element. The "flowCQI" element is used to recommend a WiFi QoS class for the flow identified in the flowId element.

Returning to FIG. 6*a*, in step 11, upon receiving the RRC_WLAN_Enable_Offload Request from the eNodeB, the UE is configured to prepare for offloading on both the uplink and the downlink. The UE can return the status of offloading preparation in an RRC_WLAN_Enable_Offload Response message. If there are no errors in preparation then the offloading begins after this message is sent and packets are routed over the WLAN link by the MRCA user plane entity on both the eNodeB and the UE.

One example of the RRC_WLAN_Enable_Offload Response is illustrated in FIG. 8*e*. The RRC_WLAN_Enable_Offload Response can be sent from the UE 340 to the eNodeB 302. The RRC_WLAN_Enable_Offload Response can include a status flag indicating if offloading was enabled from the UE or not. In the example illustrated in FIG. 8*e*, one example element is listed by attribute name, with a definition provided for the example element.

In step 12 of FIG. 6*a*, once offloading has been initiated then the eNodeB can periodically send an RRC_WLAN_Measurement Request message to the UE to further monitor the QoS and WLAN link quality. In one embodiment, the UE can be configured to send the information without the need for a request. When the UE sends this information without a request, the UE typically communicates the information at a frequency (i.e. repetition rate) and time at which to send the information to the eNodeB via the WWAN radio link.

The UE, either on its own, or upon receiving the request from the eNodeB, can collect WLAN metrics and statistics and monitor the WLAN connection that is used for offloading. The monitoring can include collecting information regarding information such as: a percentage of missed beacons, RSSI, SNR, a percentage of transmit errors and retries, a number of CRC errors, and so forth. In step 13, the UE can send this collected information in an RRC_WLAN_Measurement Response message to the eNodeB via the WWAN radio link, as shown in FIG. 6a.

One example of the RRC_WLAN_Measurement Request is illustrated in FIG. 8f. The RRC_WLAN_Measurement Request can be sent from the eNodeB 302 to the UE 340. The RRC_WLAN_Measurement Request is a request to retrieve a measurement report from the UE. The UE can then send periodic measurement reports to the eNodeB. In one embodiment, this message may not be required. It is typically used only if the eNodeB wants to get an immediate or additional report. In the example illustrated in FIG. 8f, one example element is listed by attribute name, with a definition provided for the example element.

An example of the RRC_WLAN_Measurement Response is illustrated in FIG. 8g. The RRC_WLAN_Measurement Response can be sent from the UE 340 to the eNodeB 302. The RRC_WLAN_Measurement Response includes the measurement report and parameters requested by the eNodeB. This message may be sent in response to the eNodeB request, or asynchronously at periodic intervals, depending on the system configuration, without any request from the eNodeB. In the example illustrated in FIG. 8g, one example element is listed by attribute name, with a definition provided for the example element. It should be noted that the number of example elements listed in FIG. 8g, and other examples in all of FIG. 8, is not commensurate with the amount of information communicated. In this example, the single element results in a number of parameters communicated from the UE to the eNodeB, as shown in FIG. 8g.

Figure 6B:
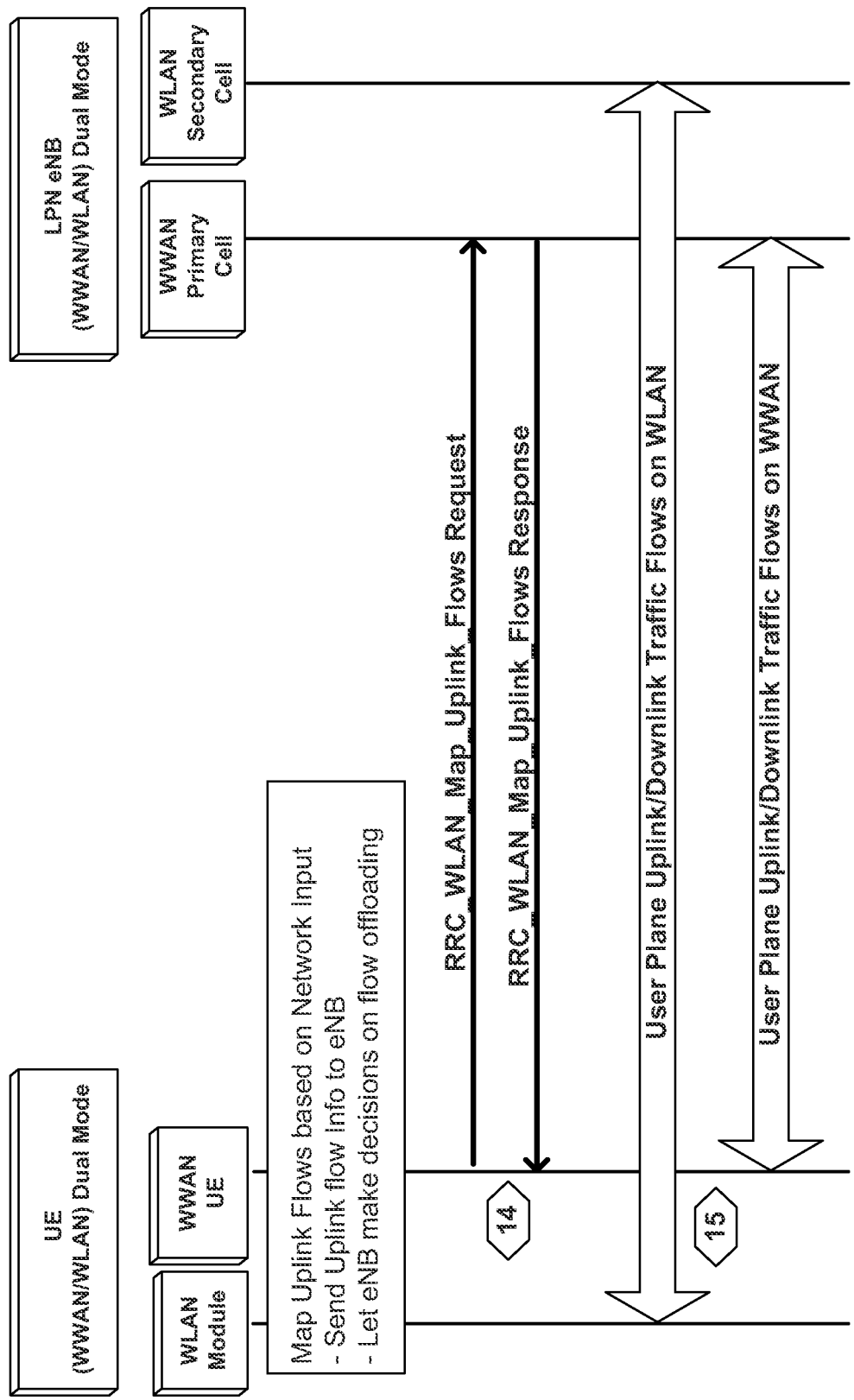

FIG. 6b provides an example illustration of additional steps that can be undertaken for WLAN QoS monitoring and flow switching. As shown in FIG. 6b, the UE can map uplink flows based on network input. The uplink flow information can be sent to the eNodeB. The eNodeB can then make decisions on flow uploading. In step 14, a decision in the WWAN network may be made to disable the WLAN offloading or change flow mapping across different links based on WLAN link quality relative to QoS needs of the data flows. The eNodeB can directly make such change for the downlink flows and indicate the change to the UE using the RRC_WLAN_Mapping Update Request message, as shown in FIG. 6b. The UE can then change the flow mapping accordingly and respond with an RRC_WLAN_Mapping Update Response message. Alternatively, the change in mapping may be requested by the UE and confirmed by the eNodeB.

For instance, an example of the RRC_WLAN_Mapping Update Request message (also referred to as the RRC_WLAN_Mapping Change Request message) is illustrated in FIG. 8h. The RRC_WLAN_Mapping Update Request message can be sent from the UE 340 to the eNodeB 302. This message is an optional message that enables the UE to request a change in a flow mapping table. The request can be used to identify which flows the UE prefers to move to the WWAN or WLAN radio links. The request can also be used to make a change in a target access point. The UE can include information about all flows in the request. In the example illustrated in FIG. 8h, five example elements are listed by attribute name, with definitions provided for each example element.

An example of an RRC_WLAN_Mapping Change_Flows Response is illustrated in FIG. 8i. The RRC_WLAN_Mapping Change_Flows Response message can be sent from the eNodeB 302 to the UE 340. This message is an optional message that includes the flow information for each of the flows and the link bearers to be selected for each flow based on the preference of the eNodeB or the WWAN network to which the eNodeB is connected. In the example illustrated in FIG. 8i, five example elements are listed by attribute name, with definitions provided for each example element.

FIGS. 8h and 8i provide an example of a mapping update/change request from the perspective of the UE, and a response from the eNodeB. As previously discussed, a mapping update or change request can also be performed by the eNodeB, with a response from the UE, as can be appreciated.

Returning to FIG. 6b, in Step 15 the user plane uplink and downlink traffic flows are transferred over the WLAN and WWAN bearers for both the uplink and downlink based on the flow mapping tables set by the MRCA module, as previously discussed.

As a UE moves around the coverage areas of an eNodeB, the UE can dynamically associate and connect with the best available integrated access points. For example, a UE can take into account the preferences indicated by an eNodeB during discovery and selection, and decide on dynamic reselection and association with a target access point. The dynamic reselection and association with a target access point can be accomplished using RRC signaling, as previously discussed and illustrated in FIGS. 4, 5, 6a and 6b.

Phase 3

Termination of Offload

Figure 7:
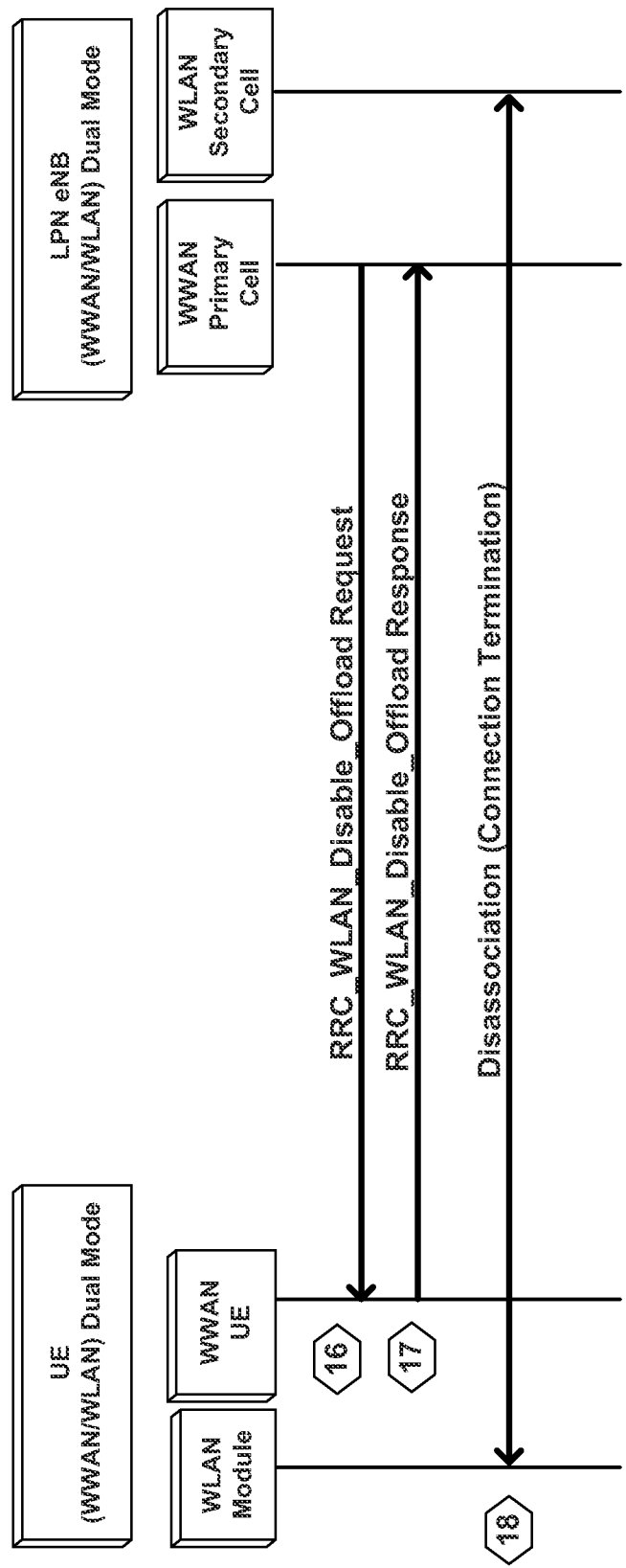
FIG. 7 depicts a flow chart of steps involved in disabling the offload of data from the WWAN network to the WLAN network and disabling the WLAN connection in accordance with an example.

FIG. 7 illustrates an example of steps that can be taken to terminate the offload of data from the WWAN to the integrated WLAN. The example provides steps that can be taken between the WWAN radio in the UE in communication with the WWAN radio (i.e. PCell) at the eNodeB, along with the integrated WLAN radio in the UE that is in communication with the integrated WLAN radio (i.e. SCell) in the eNodeB.

In Step 16, when there are no further data flows, or when the WLAN QoS and/or link quality degrades below a desired limit, among other possible reasons, the eNodeB may disable WLAN data offloading by sending an RRC_WLAN_Disable_Offload Request to the UE.

In Step 17, upon receiving the RRC_WLAN_Disable_Offload Request, the UE can disable all offloading. Any WLAN user plane packets received after this request has been received can be discarded by the UE. Once the disabling is complete and all of the current uplink flows have been directed to the WWAN radio link, the UE can send an RRC_WLAN_Disable_Offload Response, as shown in FIG. 7.

One example of the RRC_WLAN_Disable_Offload Request is illustrated in FIG. 8j. The RRC_WLAN_Disable_Offload Request can be sent from the eNodeB 302 to the UE 340. The RRC_WLAN_Measurement Request indicates that offloading is to be disabled with the selected WLAN access point. In the example illustrated in FIG. 8j, one example element is listed by attribute name, with a definition provided for the example element.

An example of the RRC_WLAN_Disable_Offload Response is illustrated in FIG. 8*k*. The RRC_WLAN_Disable_Offload Response can be sent from the UE 340 to the eNodeB 302. The RRC_WLAN_Measurement Response indicates the identification of the selected WLAN access point which offloading is to be disabled and indicates the status of the offloading operation. For example, the response will typically indicate that the offloading operation for an access point has been turned off. In the example illustrated in FIG. 8*j*, two example elements are listed by attribute name, with a definition provided for each of the example elements.

Returning to FIG. 7, in step 18 the UE can disassociate with the WLAN access point at the eNodeB. The WLAN radio at the UE may be turned off at this point to conserve battery power. The WLAN Offload can also be triggered by a WLAN radio link failure that is detected by the UE. In this case, the UE can send the RRC_WLAN_Disable_Offload Request. The eNodeB can confirm that the request was received by sending the RRC_WLAN_Disable_Offload Response.

It should be noted that in each of the steps 1-18 that are previously discussed, and illustrated in FIGS. 4, 5, 6*a*, 6*b* and 7, that the communication is typically accomplished via the WWAN radio connection between the UE and the PCell at the eNodeB. This is illustrated particularly in steps 0, 1, 4, 5, 7, 7*a*, 10-14, 16 and 17. Direct communication between the integrated WLAN radios at the UE and eNodeB are illustrated in steps 8, 9, 15, and 18. The integration of the WLAN access points with the WWAN at the eNodeB enables these communications to be carried by the WWAN radio connection. The communications are typically carried via higher layer signaling, such as RRC signaling, as shown in the examples of FIG. 8*a*-8*k*. The examples of FIG. 8 are not intended to be limiting. Rather, they are provided merely as examples of the type of data that may be communicated to allow data traffic flows on the WWAN to be offloaded to a WLAN connection between the dual mode UE and the dual mode eNodeB. Various system architectures may necessitate additional messaging, or fewer messages than those provided in the examples of FIGS. 4-8.

Figure 9:
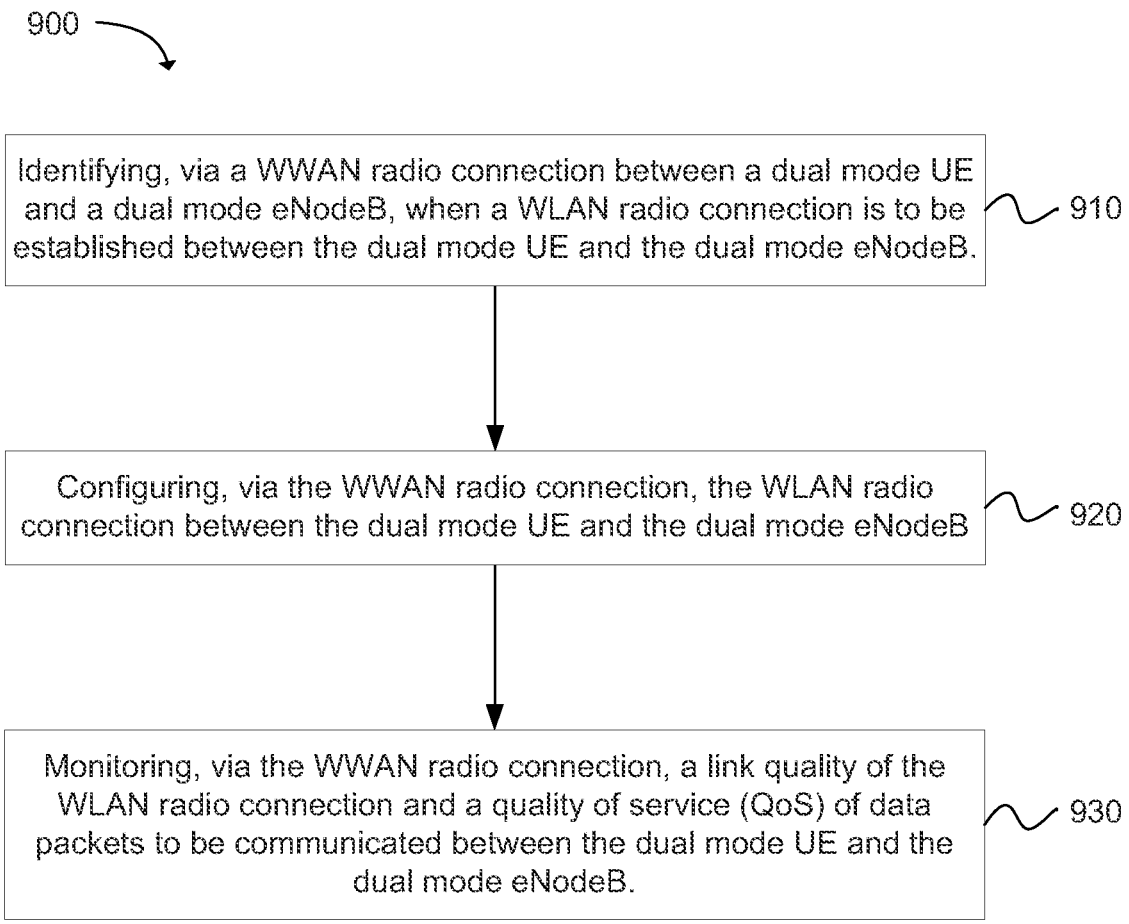
FIG. 9 depicts a flow chart of a method for MRCA WWAN assisted WLAN discovery and association in accordance with an example.
Figure 10:
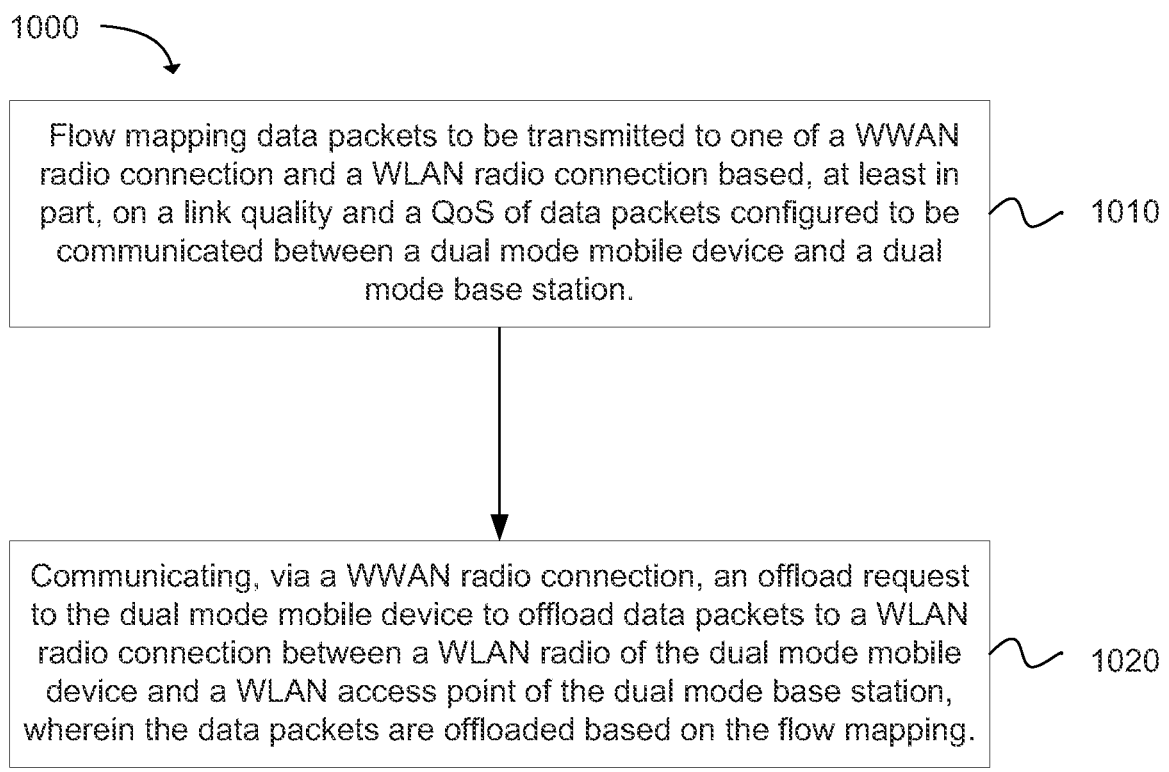
FIG. 10 depicts a flow chart of a method for MRCA flow switching between a WWAN and a WLAN in a wireless device in accordance with an example.

In one embodiment, a method 900 for Multi-Radio Access Technology (RAT) Carrier Aggregation (MRCA) wireless wide area network (WWAN) assisted wireless local area network (WLAN) discovery and association is disclosed, as depicted in the flow chart of FIG. 9. The method comprises the operation of identifying, via a WWAN radio connection between a dual mode UE and a dual mode eNodeB, when a WLAN radio connection is to be established between the dual mode UE and the dual mode eNodeB, as shown in block 910. The WLAN radio connection between the dual mode UE and the dual mode eNodeB is configured via the WWAN radio connection, as shown in block 920. A link quality of the WLAN radio and a quality of service (QoS) of data packets to be communicated between the dual mode UE and the dual mode eNodeB is monitored via the WWAN radio connection, as shown in block 930.

In one embodiment, the operation of identifying when a WLAN radio connection is to be established further comprises exchanging, via the WWAN radio connection, a WLAN carrier aggregation capability between the dual mode wireless device and the dual mode eNodeB. A determination can be made when
a WLAN access point at the dual mode eNodeB is to be turned on based, at least in part on at least one of: a communication load on the WWAN; a communication load on a core network associated with the WWAN; and a number of dual mode UEs that can support carrier aggregation that are located within a coverage area of the dual mode eNodeB.

In one embodiment, the operation of configuring the WLAN radio connection further comprises communicating WLAN discovery assistance information from the dual mode eNodeB to the dual mode UE via the WWAN radio connection. Configuring the WLAN radio connection can further comprise sending a WLAN configuration request from the dual mode eNodeB to the dual mode UE via the WWAN radio connection.

In one embodiment, the operation of sending the WLAN configuration request further comprises sending, from the dual mode eNodeB to the dual mode UE via the WWAN radio connection: a WLAN network information element that includes information about each WLAN access point attached to the dual mode eNodeB; a network identifier element that is at least one of a service set identification (SSID) and a Homogenous Extended Service Set identification (HESSID); a radio parameter element that includes at least one of a channel identifier of the WLAN radio connection, a frequency band of each WLAN radio connection, and a maximum data rate of each WLAN radio connection; and a request measurement element that includes a flag indicating a request for a received signal strength indicator (RSSI) of the WLAN radio connection, a signal to noise ratio of the WLAN radio connection, and a percent of missed beacons for each WLAN access point at the dual mode eNodeB.

In one embodiment, the operation of configuring the WLAN radio connection further comprises: identifying priority information for each WLAN access point at the dual mode eNodeB when multiple WLAN access points exist; turning a WLAN radio on at the dual mode UE; and collecting WLAN radio pre-association metrics.

In one embodiment, the operation of configuring the WLAN radio connection further comprises receiving a WLAN configuration response at the dual mode eNodeB from the dual mode UE via the WWAN radio connection. The operation of receiving the WLAN configuration response can further comprise receiving, at the dual mode eNodeB from the dual mode UE, via the WWAN radio connection at least one of: a status of the WLAN radio at the dual mode device, wherein the status includes at least one of a status of busy, a status of not available for carrier aggregation, and a status of available for carrier aggregation; pre-association measurement information for at least one WLAN access point in the dual mode eNodeB; a received signal strength indicator (RSSI) measurement for the WLAN radio in the dual mode UE; a percentage of missed beacons for the WLAN radio in the dual mode UE; and a signal to noise ratio for the WLAN radio in the dual mode UE.

In one embodiment, the operation of configuring the WLAN radio connection further comprises sending a WLAN configuration acknowledgment from the dual mode eNodeB to the dual mode UE via the WWAN radio connection. The operation of sending the WLAN configuration acknowledgement can further comprise sending, from the dual mode eNodeB to the dual mode UE, via the WWAN radio connection, at least one of: a status association flag indicating whether a WLAN association should be established between the dual mode eNodeB and the dual mode UE; a WLAN identification comprising a basic service set identification (BSSID) of at least one WLAN radio at the dual mode eNodeB with which association is to be established; a mode of connection comprising at least one of an infrastructure mode and a WiFi direct mode; and a reason code indicating a reason for declining association.

In one embodiment, the operation of configuring the WLAN radio connection further comprises initiating the WLAN radio connection between the WLAN radio of the dual mode UE and the WLAN access point of the dual mode eNodeB. Initiating the WLAN radio connection can further comprise initiation of the WLAN radio connection between the WLAN radio of the dual mode UE and a selected WLAN access point of the dual mode eNodeB, wherein the WLAN access point is selected, at least in part, based on a received signal strength indicator (RSSI) measurement between the WLAN radio of the dual mode UE and each WLAN access point of the dual mode eNodeB.

In one embodiment, the operation of configuring the WLAN radio connection further comprises dynamically associating the WLAN radio of the dual mode UE with a different WLAN access point of the dual mode eNodeB when an RSSI measurement changes due to a movement of the dual mode UE and results in a different WLAN access point having a desired RSSI measurement.

The method 900 can further comprise sending, via the WWAN radio connection, a WLAN disable offload request from the dual mode eNodeB to the dual mode UE, wherein the WLAN disable offload request is sent, at least in part, based on: a lack of data to transmit on the WLAN radio connection; a WLAN radio connection link quality lower than a selected threshold; and a WLAN QoS less than a desired threshold. The WLAN disable offload request can include a WLAN identification that is a basic service set identification (BSSID) of the WLAN access point with which offloading is to be disabled.

In one embodiment, the method 900 can further comprise redirecting, at the dual mode UE, WLAN traffic flows to the WWAN radio connection; and sending, via the WWAN radio connection, a WLAN disable offload response from the dual mode mobile wireless device to the dual mode eNodeB.

The operation of sending the WLAN disable offload response can include: a WLAN identification that is a basic service set identification (BSSID) of the WLAN access point with which offloading is to be disabled; and a status offloading indicator that indicates a status of the offloading operation as one of on and off.

In one embodiment, the method 900 can further comprise terminating the WLAN radio connection between the dual mode UE and the dual mode eNodeB to disassociate the WLAN access point and the WLAN radio.

In another embodiment, a method 1000 for Multi-Radio Access Technology (RAT) Carrier Aggregation (MRCA) flow switching between a wireless wide area network (WWAN) and a wireless local area network (WLAN) in a wireless device is disclosed. The method comprises flow mapping data packets to be transmitted to one of a WWAN radio connection and a WLAN radio connection based, at least in part, on a link quality and a quality of service (QoS) of data packets configured to be communicated between a dual mode mobile device and a dual mode base station, as shown in block 1010; and communicating, via a WWAN radio connection, an offload request to the dual mode mobile device to offload data packets to a WLAN radio connection between a WLAN radio of the dual mode mobile device and a WLAN access point of the dual mode base station, wherein the data packets are offloaded based on the flow mapping, as shown in block 1020.

In one embodiment, the method 1000 further comprises sending measurement reports of a link quality of the WLAN radio connection at a selected frequency from the WLAN radio of the dual mode mobile device to the WLAN access point of the dual mode base station via the WLAN radio connection.

In one embodiment, the operation of flow mapping the data packets further comprises sending a WLAN enable offload request from the dual mode base station to the dual mode mobile device via the WWAN radio connection when the link quality of the WLAN radio connection is greater than a selected threshold.

In one embodiment, the operation of sending the WLAN enable offload request includes sending a flow map for downlink and uplink flows for routing downlink and uplink flows to one of the WLAN radio connection and the WWAN radio connection.

In one embodiment, the operation of sending the WLAN enable offload request includes sending, from the dual mode base station to the dual mode mobile device, via the WWAN radio connection, at least one of: a WLAN identification that includes a basic service set identification (BSSID) of the WLAN access point with which the data packets will be offloaded; a mode of connection including at least one of an infrastructure mode and a WiFi direct mode; flow information about each current flow in the WWAN radio connection; a number of flows in the WWAN radio connection; a flow identification value for each of the flows; and a flow quality of service (QoS) class identifier (QCI) that includes a recommended WiFi QoS class for each of the flows.

In one embodiment, the operation of communicating an offload request further comprises sending a WLAN enable offload response message from the dual mode mobile wireless device to the dual mode base station via the WWAN radio connection communicating the dual mode wireless device's ability to route the data packets over the WLAN radio connection.

In one embodiment, the operation of sending the WLAN enable offload response message includes sending, from the dual mode mobile wireless device to the dual mode base station via the WWAN radio connection, a status offloading message that includes a flag indicating whether offloading was successfully enabled at the dual mode mobile wireless device.

In one embodiment, the operation of communicating an offload request further comprises offloading selected uplink and downlink data packets from the WWAN radio connection to the WLAN radio connection between the dual mode mobile wireless device and the dual mode mobile base station after the WLAN enable offload response message is sent.

In one embodiment, the operation of monitoring the link quality of the WLAN radio connection further comprises measuring selected metrics of the WLAN radio connection while offloading selected uplink and downlink data packets and transmitting the selected metrics to the dual mode base station via the WWAN radio connection, wherein the selected metrics are one of: sent by the mobile wireless device at a predetermined interval and requested by the dual mode base station.

In one embodiment, the operation of measuring selected metrics further comprises sending a request for measurement of selected metrics from the dual mode base station to the dual mode mobile device, via the WWAN radio connection, wherein the request includes a flag indicating a request for at least one metric selected from the group consisting of: a received signal strength indication (RSSI), a signal to noise ratio (SNR), a percent missed beacons, a percent transmit errors, a percent transmit retries, cyclic redundancy check (CRC) errors, and a transmit power level.

In one embodiment, the operation of transmitting the selected metrics to the dual mode base station further comprises sending a WLAN measurement response from the dual mode mobile device to the dual mode base station, via the WWAN radio connection, wherein the response includes a measurement report that includes a value for at least one parameter selected from the list consisting of a received signal strength indication (RSSI), a signal to noise ratio (SNR), a percent missed beacons, a percent transmit errors, a percent transmit retries, cyclic redundancy check (CRC) errors, and a transmit power level.

In one embodiment, the operation of flow mapping further comprises updating the flow map for the downlink and uplink flows for routing the downlink and uplink flows to one of the WLAN radio connection and the WWAN radio connection based, at least in part, on the QoS and quality of the WLAN radio connection.

In another embodiment, the operation of the flow mapping further comprises: sending, via the WWAN radio connection, a WLAN map uplink flow request from the dual mode base station to the dual mode wireless device; updating the flow map at the dual mode wireless device; and sending, via the WWAN radio connection, a WLAN map uplink flow response from the dual mode wireless device to the dual mode base station.

In another embodiment, the method of claim 1000 can further comprise updating a flow map by receiving a WLAN mapping change request at the dual mode base station from the dual mode mobile device, via the WWAN radio connection, to request a change in a flow mapping table for a selected flow. The request can include at least one of: a basic service set identification (BSSID) of the WLAN access point to which the data packets will be offloaded; information about each flow on at least one of the WLAN radio connection and the WWAN radio connection; a number of flows between the dual mode base station and the dual mode mobile device; a flow identifier of each of the flows operating between the dual mode base station and the dual mode mobile device; and a bearer selected for the flows operating between the dual mode base station and the dual mode mobile device, wherein the bearer is one of the WWAN radio connection and the WLAN radio connection.

Updating the flow map can further comprise sending a WLAN mapping change response from the dual mode base station to the dual mode mobile device, via the WWAN radio connection, the WLAN mapping change response including at least one of: information about each flow on at least one of the WLAN radio connection and the WWAN radio connection; a basic service set identification (BSSID) of the WLAN access point to which the data packets will be offloaded; a number of flows between the dual mode base station and the dual mode mobile device; a flow identifier of each of the flows operating between the dual mode base station and the dual mode mobile device; and a bearer selected for the flows operating between the dual mode base station and the dual mode mobile device, wherein the bearer is one of the WWAN radio connection and the WLAN radio connection.

In another embodiment, the operation of flow mapping further comprises transferring user plane data flows over one of WWAN and WLAN bearers for the downlink and the uplink flows based on the updated flow map.

Figure 11:
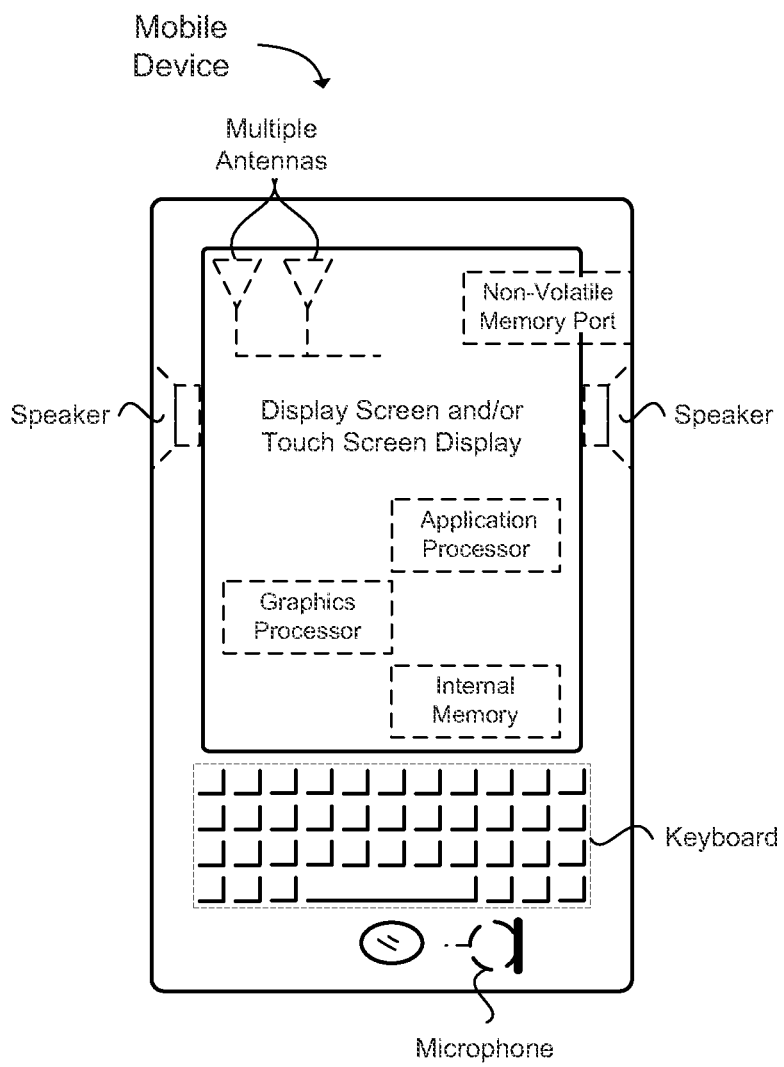
FIG. 11 illustrates a mobile wireless device in accordance with an example.

FIG. 11 provides an example illustration of a mobile device, such as a user equipment (UE), a mobile station (MS), a mobile wireless device, a mobile communication device, a tablet, a handset, or other type of mobile wireless device. The mobile device can include one or more antennas configured to communicate with a base station (BS), an evolved Node B (eNB), or other type of wireless wide area network (WWAN) access point. The mobile device can be configured to communicate using at least one wireless communication standard including 3GPP LTE, WiMAX, High Speed Packet Access (HSPA), Bluetooth, and WiFi. The mobile device can communicate using separate antennas for each wireless communication standard or shared antennas for multiple wireless communication standards. The mobile device can communicate in a wireless local area network (WLAN), a wireless personal area network (WPAN), and/or a wireless wide area network (WWAN).

FIG. 11 also provides an illustration of a microphone and one or more speakers that can be used for audio input and output from the mobile device. The display screen may be a liquid crystal display (LCD) screen, or other type of display screen such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Various techniques, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of materials, fasteners, sizes, lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A Multi-Radio Access Technology (RAT) Carrier Aggregation (MRCA) module comprising:
   a control signaling module in an NodeB that includes a wireless wide area network (WWAN) radio integrated with a wireless local area network (WLAN) radio, wherein the control signaling module is configured to communicate WWAN control signaling and WLAN control signaling from the NodeB via a WWAN radio connection of the wireless device, wherein the control signaling module is configured to send control plane messages via radio resource control (RRC) signaling between the eNodeB containing the MCRA module and a wireless device containing the MRCA module via the WWAN radio connection between the eNodeB and the wireless device; and
   a WLAN interface module configured to interface between the WWAN radio and the WLAN radio in the NodeB to communicate the control signaling communicated via the WWAN radio connection with the WLAN radio.

2. The MRCA module of claim 1, wherein the MRCA module is configured to operate in the wireless device that is one of a mobile wireless device, a fixed wireless device, a mobile station (MS), a user equipment (UE), a base station (BS), a baseband unit (BBU), a remote radio head (RRH), a remote radio equipment (RRE), a remote radio unit (RRU), and combinations thereof.

3. The MRCA module of claim 1, wherein the control plane messages are used to perform at least one of initiate data offload from the WWAN radio to the WLAN radio, terminate data offload, and control the data offload to the WLAN radio.

4. The MRCA module of claim 1, wherein the WLAN interface module comprises:
   a WLAN radio monitoring module configured to setup and monitor the WLAN radio on a control plane in communication with a WLAN device driver;
   a WLAN receive module configured to communicate packets received by the WLAN radio to the WLAN device driver; and
   a WLAN transmit module configured to communicate packets from the WLAN device driver to the WLAN radio for transmission.

5. A method for Multi-Radio Access Technology (RAT) Carrier Aggregation (MRCA) wireless wide area network (WWAN) assisted wireless local area network (WLAN) discovery and association, comprising:
   identifying, via a WWAN radio connection between a dual mode UE and a dual mode eNodeB, when a WLAN radio connection is to be established between the dual mode UE and the dual mode eNodeB;
   configuring, via the WWAN radio connection, the WLAN radio connection between the dual mode UE and the dual mode eNodeB; and
   monitoring, via the WWAN radio connection, a link quality of the WLAN radio connection and a quality of service (QoS) of data packets to be communicated between the dual mode UE and the dual mode eNodeB.

6. The method of claim 5, wherein identifying when a WLAN radio connection is to be established further comprises exchanging, via the WWAN radio connection, a WLAN carrier aggregation capability between the dual mode wireless device and the dual mode eNodeB.

7. The method of claim 5, wherein identifying when a WLAN radio connection is to be established further comprises determining when a WLAN access point at the dual mode eNodeB is to be turned on based, at least in part on at least one of:
   a communication load on the WWAN;
   a communication load on a core network associated with the WWAN; and
   a number of dual mode UEs that can support carrier aggregation that are located within a coverage area of the dual mode eNodeB.

8. The method of claim 5, wherein configuring the WLAN radio connection further comprises communicating WLAN discovery assistance information from the dual mode eNodeB to the dual mode UE via the WWAN radio connection.

9. The method of claim 5, wherein configuring the WLAN radio connection further comprises sending a WLAN configuration request from the dual mode eNodeB to the dual mode UE via the WWAN radio connection.

10. The method of claim 9, wherein sending the WLAN configuration request further comprises sending, from the dual mode eNodeB to the dual mode UE via the WWAN radio connection:
- a WLAN network information element that includes information about each WLAN access point attached to the dual mode eNodeB;
- a network identifier element that is at least one of a service set identification (SSID) and a Homogenous Extended Service Set identification (HESSID) to identify a WLAN access point at the eNodeB;
- a radio parameter element that includes at least one of a channel identifier of the WLAN radio connection, a frequency band of each WLAN radio connection, and a maximum data rate of each WLAN radio connection; and
- a request measurement element that includes a flag indicating a request for a received signal strength indicator (RSSI) of the WLAN radio connection, a signal to noise ratio of the WLAN radio connection, and a percent of missed beacons for each WLAN access point at the dual mode eNodeB.

11. The method of claim 5, wherein configuring the WLAN radio connection further comprises:
- identifying priority information for each WLAN access point at the dual mode eNodeB when multiple WLAN access points exist;
- turning a WLAN radio on at the dual mode UE; and
- collecting WLAN radio pre-association metrics.

12. The method of claim 5, wherein configuring the WLAN radio connection further comprises receiving a WLAN configuration response at the dual mode eNodeB from the dual mode UE via the WWAN radio connection.

13. The method of claim 12, wherein receiving the WLAN configuration response further comprises receiving, at the dual mode eNodeB from the dual mode UE, via the WWAN radio connection at least one of:
- a status of the WLAN radio at the dual mode device, wherein the status includes at least one of a status of busy, a status of not available for carrier aggregation, and a status of available for carrier aggregation;
- pre-association measurement information for at least one WLAN access point in the dual mode eNodeB;
- a received signal strength indicator (RSSI) measurement for the WLAN radio in the dual mode UE;
- a percentage of missed beacons for the WLAN radio in the dual mode UE; and
- a signal to noise ratio for the WLAN radio in the dual mode UE.

14. The method of claim 5, wherein configuring the WLAN radio connection further comprises sending a WLAN configuration acknowledgment from the dual mode eNodeB to the dual mode UE via the WWAN radio connection.

15. The method of claim 14, wherein sending the WLAN configuration acknowledgement further comprises sending, from the dual mode eNodeB to the dual mode UE, via the WWAN radio connection, at least one of:
- a status association flag indicating whether a WLAN association should be established between the dual mode eNodeB and the dual mode UE;
- a WLAN identification comprising a basic service set identification (BSSID) of at least one WLAN radio at the dual mode eNodeB with which association is to be established;
- a mode of connection comprising at least one of an infrastructure mode and a WiFi direct mode; and
- a reason code indicating a reason for declining association.

16. The method of claim 5, wherein configuring the WLAN radio connection further comprises initiating the WLAN radio connection between the WLAN radio of the dual mode UE and the WLAN access point of the dual mode eNodeB.

17. The method of claim 16, wherein initiating the WLAN radio connection further comprises initiation of the WLAN radio connection between the WLAN radio of the dual mode UE and a selected WLAN access point of the dual mode eNodeB, wherein the WLAN access point is selected, at least in part, based on a received signal strength indicator (RSSI) measurement between the WLAN radio of the dual mode UE and each WLAN access point of the dual mode eNodeB.

18. The method of claim 17, wherein configuring the WLAN radio connection further comprises dynamically associating the WLAN radio of the dual mode UE with a different WLAN access point of the dual mode eNodeB when an RSSI measurement changes due to a movement of the dual mode UE and results in a different WLAN access point having a desired RSSI measurement.

19. The method of claim 5, further comprising sending, via the WWAN radio connection, a WLAN disable offload request from the dual mode eNodeB to the dual mode UE, wherein the WLAN disable offload request is sent, at least in part, based on:
- a lack of data to transmit on the WLAN radio connection;
- a WLAN radio connection link quality lower than a selected threshold; and
- a WLAN QoS less than a desired threshold.

20. The method of claim 19, wherein the WLAN disable offload request includes a WLAN identification that is a basic service set identification (BSSID) of the WLAN access point with which offloading is to be disabled.

21. The method of claim 19, further comprising:
- redirecting, at the dual mode UE, WLAN traffic flows to the WWAN radio connection; and
- sending, via the WWAN radio connection, a WLAN disable offload response from the dual mode mobile wireless device to the dual mode eNodeB.

22. The method of claim 21, wherein sending the WLAN disable offload response includes:
- a WLAN identification that is a basic service set identification (BSSID) of the WLAN access point with which offloading is to be disabled; and
- a status offloading indicator that indicates a status of the offloading operation as one of on and off.

23. The method of claim 21, further comprising terminating the WLAN radio connection between the dual mode UE and the dual mode eNodeB to disassociate the WLAN access point and the WLAN radio.

24. A non-transitory machine readable storage medium comprising a plurality of instructions adapted to be executed to implement the method for Multi-Radio Access Technology (RAT) Carrier Aggregation (MRCA) wireless wide area network (WWAN) assisted wireless local area network (WLAN) discovery and association, comprising:
- exchanging, via a WWAN radio connection between a dual mode UE and a dual mode eNodeB, a WLAN carrier aggregation capability of the dual mode UE;
- configuring, via the WWAN radio connection, the WLAN radio connection between the dual mode UE and the dual mode eNodeB; and
- monitoring, via the WWAN radio connection, a link quality of the WLAN radio connection and a quality of service (QoS) of data packets to be communicated between the dual mode UE and the dual mode eNodeB.

25. The method of claim 24, further comprising mapping a quality of service (QoS) class identifier (QCI) associated with each service flow in the WWAN that is to be offloaded to the WLAN radio connection, wherein each service flow is mapped based on the link quality and QoS of the data packets.

* * * * *

UNITED STATES PATENT AND TRADEMARK OFFICE
CERTIFICATE OF CORRECTION

| | | |
|---|---|---|
| PATENT NO. | : 8,817,623 B2 | Page 1 of 1 |
| APPLICATION NO. | : 13/537989 | |
| DATED | : August 26, 2014 | |
| INVENTOR(S) | : Vivek Gupta et al. | |

It is certified that error appears in the above-identified patent and that said Letters Patent is hereby corrected as shown below:

In the Drawings,

On Sheet 6 of 15, FIG. 5, line 8, delete "connecton" and insert -- connection --, therefor.

On Sheet 7 of 15, FIG. 6a, line 10, delete "connecton" and insert -- connection --, therefor.

On Sheet 10 of 15, FIG. 8b, line 5, delete "Pre-Associoation" and insert -- Pre-Association --, therefor.

On Sheet 10 of 15, FIG. 8c, line 3, delete "etablished." and insert -- established. --, therefor.

In the Claims,

In column 29, line 58, In Claim 1, delete "NodeB" and insert -- eNodeB --, therefor.

In column 29, line 63, In Claim 1, delete "NodeB" and insert -- eNodeB --, therefor.

In column 30, line 5, In Claim 1, delete "NodeB" and insert -- eNodeB --, therefor.

Signed and Sealed this
Second Day of December, 2014

Michelle K. Lee
*Deputy Director of the United States Patent and Trademark Office*